United States Patent
Murray

(10) Patent No.: US 6,694,329 B2
(45) Date of Patent: Feb. 17, 2004

(54) METHODS OF ORGANIZING INFORMATION

(75) Inventor: Graham Christopher Oxland Murray, St. Ives (AU)

(73) Assignee: Streamline Systems PTY LTD, North Sydney (AU)

(*) Notice: Subject to any disclaimer, the term of this patent is extended or adjusted under 35 U.S.C. 154(b) by 0 days.

(21) Appl. No.: 10/327,593

(22) Filed: Dec. 23, 2002

(65) Prior Publication Data

US 2003/0115209 A1 Jun. 19, 2003

Related U.S. Application Data

(63) Continuation of application No. 10/040,388, filed on Jan. 9, 2002, which is a continuation of application No. PCT/AU99/00559, filed on Jul. 9, 1999.

(51) Int. Cl.[7] .............................................. G06F 17/30
(52) U.S. Cl. ........................ 707/103 Y; 707/3; 707/5; 707/6; 706/55
(58) Field of Search .............................. 707/1–7, 9–10, 707/100–104.1; 706/55; 709/223–227

(56) References Cited

U.S. PATENT DOCUMENTS

| | | | |
|---|---|---|---|
| 4,905,163 A | * | 2/1990 | Garber et al. ................. 706/55 |
| 5,745,895 A | | 4/1998 | Bingham et al. ............. 707/10 |
| 5,819,270 A | | 10/1998 | Malone et al. ................. 707/7 |

FOREIGN PATENT DOCUMENTS

EP     0 196 064 A2    10/1986    ........... G06F/17/30

* cited by examiner

Primary Examiner—Jean R. Homere
Assistant Examiner—Mohammad Ali
(74) Attorney, Agent, or Firm—Oliff & Berridge PLC

(57) ABSTRACT

A method of organizing information into a concept network, to facilitate the creation and sharing of knowledge, includes the steps of: categorizing ideas and thoughts into concepts; creating links between concepts; categorizing information into objects; categorizing objects into concepts; creating links between objects; and locating information relevant to any object by evaluating direct object links between that object and directly linked objects, and indirect object links and concept links affecting that object. The method is useful for guiding people and the ways in which they think, communicate and work together, aligning and integrating diverse processes and systems and organizing large quantities of data stored on computer systems, and using the new ways of organizing thinking, communication, systems and data to achieve improved quality of knowledge, knowledge sharing, decision making and timely, effective action.

9 Claims, 15 Drawing Sheets

*Sample Concept Network*

*Importance Flow*

*Performance Flow*

*Accountability Flow*

SIPRA Performance Engine

METHODS OF ORGANIZING INFORMATION

This is a Continuation of application Ser. No. 10/040,388 filed Jan. 9, 2002, which in turn is a Continuation of International Application No. PCT/AU99/00559 filed Jul. 9, 1999. The entire disclosure of the prior applications is hereby incorporated by reference herein in its entirety.

This invention relates to methods of organising information. It relates particularly but not exclusively to a method of organising information into a concept network, to facilitate the creation and sharing of knowledge, guiding people and the ways in which they think, communicate and work together, aligning and integrating diverse processes and systems and organising large quantities of data stored on computer systems, and using the new ways of organising thinking, communication, systems and data to achieve improved quality of knowledge, knowledge sharing, decision making and timely, effective action.

The following discussion relates primarily to a business enterprise. It is to be understood, however, that the present invention is relevant to a broad range of different organizations including non-profit organizations and groups of related or unrelated organizations.

An enterprise has a vast amount of intellectual capital tied up in the minds of its people. The success of the enterprise is dependent upon these people being able to work together and apply their knowledge synergistically, to achieve more than can be achieved by individuals working alone. To do this, they need efficient and effective ways of communicating and coordinating their activities. The ability of a group of people to communicate and coordinate is dependent upon the people in the group sharing mental models which are the basis for shared understanding.

Potentially the most important implicit knowledge about an enterprise is to do with the subtle connections between concepts and objects. The invention provides a new way of managing this knowledge, making it explicit and readily shared between people in context.

It is widely acknowledged that enterprises must create a culture of learning and knowledge sharing, but there is a lack of methods to support a sustainable, systemic solution.

Large enterprises are complex, highly integrated systems with a multitude of flows (of goods, information, money, etc.) in a multitude of inter-connected paths. Systems that are set up to manage enterprises typically are built to address a relatively small part of the whole e.g. financial consolidation, bill of materials, email. These systems are usually developed by independent groups of people, implemented as distinct processes, and contribute little towards integrating the whole business. Clearly, because the problems are so large and complex, they have been fragmented to enable them to be solved in part. This has resulted in enterprises that are highly fragmented, their people operate in "silos", and there are enormous inefficiencies at the boundaries of the poorly integrated components.

The problem of efficiently storing and accessing information has existed for a long time. Libraries typically stock vast reservoirs of information in the forms of books and computer databases, and these are typically catalogued by reference to such criteria as author's name, title and predominant subject matter. Catalogue indexes are useful for locating books about particular subjects, but they are far from perfect when the quickest and most efficient answer to a particular problem is required. To answer a particular problem, a person must first locate all relevant books and then read them; and there is not guarantee that the most relevant information will not be catalogued in a book which has been catalogued by reference to a different subject matter, and therefore not located in the catalogue search.

This problem has been accentuated by the burgeoning of the Internet. The Internet gives a person access to seemingly infinite information resources, but almost no tools for harnessing that information, with the consequence that Internet-based research frequently consumes considerable time and ends in frustration. While highly relevant data may be available on the Internet, extensive searching is often unsuccessful in locating it.

Perhaps the most commonly used computerised method for storing and accessing information is a relational database. A relational database contains a plurality of tables. Each table contains a plurality of records, and each record contains a plurality of fields. Links are established between individual fields in different tables. However, there are only limited areas of information which are suitable for storing and accessing in a relational database format. For the vast majority of types of information, the nature of linkages between different types of information is either unknown or imprecisely defined.

A great strength of computers—their ability to process precisely defined information in a linear manner—becomes a great weakness when it comes to modelling complex systems, in which the data and links between different pieces of data are not precisely defined and in which information arrives in an unstructured parallel form rather than in a linear form.

Research into the needs of large enterprises around the world has identified nine key areas of need which are generally not satisfied today:

1. Strategic Thinking

What are the mental models that drive our business, give meaning to information and enable us to communicate?

How can we decide what's important

What connects with what?

How can we increase the effectiveness of the enterprise?

2. Sharing Knowledge

What are people thinking and saying about this subject?

How can we share our ideas and knowledge quickly and easily?

What is all the known information that is relevant to this object?

Who is doing what? In relation to this object? In relation to the bigger picture?

3. Sustaining Performance

We need more balanced views of performance.

We need to track the dynamics of the business, seeing performance over time, with important trends, troughs and peaks highlighted for timely action.

We need to keep everything, connected and visible, seeing the big picture and the details.

4. Making it Happen

What are the initiatives and projects we need to focus on?

What is driving the changes?

Where and when do we expect to see business improvements and specific outcomes?

What are all the actions, so I can be sure that nothing falls through the cracks?

5. Knowing Perceptions

What can be done to increase leadership strength in our enterprise?

We need to measure outcomes, including understanding the perceptions of our key relationships.

We need to integrate "soft" data with our "hard" data so we can better understand the whole situation and make better decisions.

We need to gather perception data more frequently, and integrate it into our strategic thinking and performance management systems.

6. Business Intelligence

We need to easily access and analyze our data to produce useful management information.

We need the ability to generate and analyze our budgets, forecasts and 'what . . . ifs' across thousands of objects quickly and easily.

Our systems must be integrated, and produce the right information quickly or flexibly.

We need to trap explanations for data variations, and to have appropriate comments available when needed.

7. Market Intelligence

We need to integrate market research data with our own sales data and the valuable specific knowledge our sales people have about their local market.

Selling many products in many locations poses a challenge of diverse competitors, conditions and systems.

We need a fast, consistent world view.

8. Financial Intelligence

What are the critical areas of the business, and all the legal and management entities that need to be managed?

Statutory and Management accounts must be consolidated, quickly and interpreted intelligently, with meaning.

What are all the rules and regulations with which we need to comply, taking into account multiple currencies, adjustments and intercompany eliminations.

What are the global and local trends and changes that will impact financial performance?

What actions are people taking to address the critical issues?

9. Resource Intelligence

Where and when are particular resources and skills required?

What is the most intelligent allocation of work and resources that balances all competing demands? What impacts will this have on our projects and performance targets?

An extensive discussion of the different known ways of storing and accessing information and knowledge, including the advantages and disadvantages associated with each, is published on the Internet website: www.thoughtweb.com.

SUMMARY OF THE INVENTION

According to the present invention, there is provided a method of organising information into a concept network, to facilitate the creation and sharing of knowledge, including the steps of:

categorizing ideas and thoughts into concepts;

creating links between concepts;

categorizing information into objects;

categorizing objects into concepts;

creating links between objects; and locating information relevant to any object by evaluating direct object links between that object and directly linked objects, and indirect object links and concept links affecting that object.

The object and concept links may be Boolean links (links which either exist or do not exist), but it is preferred that each link have a qualitative value indicating the strength of the relationship between an object and a linked object, an object and a linked concept, or a concept and a linked concept. The degree of "relevance" of any other object to a given object can then be assessed by calculating the "strength" of the relationship between the given object and the other object, both through a direct link between the objects (if any) and through any indirect links (via other intervening objects or concepts).

One or more of the objects or concepts may represent goals for an organization to which the concept network relates, and the organization may have an overall purpose. A concept network is not, of course, limited to a single organization and in the following discussion it is to be understood that reference to an organization includes reference to two or more organizations. Each object and concept within the concept network may be evaluated as having an importance value relative to each goal, and each goal may have an importance value relative to the organisational purpose. In most organizations, different goals compete with each other for organisational resources, and the present invention may be used to allocate resources to the various goals with a view to optimising the success of the overall organisational purpose.

It is preferred that the concept network take into account changes in the network over time. In particular, the following components may vary over time: the purpose of the organization, the degree of existence of any object (objects may be added to or removed from the network), the properties of links between concepts, and the strength of links between objects.

Each person within an enterprise may be categorised as an "object", classified within a concept such as "human resources". Different projects, tasks and physical resources may also be categorised as objects, and a person may be categorised as an "accountable object", being accountable for the performance of particular tasks or the achievement of particular goals. An accountable object may be directly or indirectly accountable for other objects. An action priority rating for an accountable object may be calculated by evaluating: the importance of each object for which the accountable object is accountable, the degree of accountability between the accountable object and each object, the extent to which the accountable object has addressed all issues and actions associated with each object, the time which has elapsed since the accountable object last considered each object, a review cycle duration, and risk and success values associated with each object.

An object which is a task or goal or has a defined purpose may have associated with it one or more performance measures, which indicate the degree to which the task, goal or purpose has been achieved. The performance of a particular object typically depends upon the performance of linked objects, and it is therefore desirable that the performance measurement of an object include performance measurements of linked objects.

There may be success and risk values associated with objects. A success value for an object is calculated from the object's importance and the object's performance. A risk value for an object is calculated from the object's importance and the object's lack of performance. Both success and risk are relative measurements, in that they are calculated from the perspective of another object. The success and risk values of a particular object from the perspective of a linked object may be different from the success and risk values of that particular object from the perspective of a different linked object.

The concept network of the present invention may be used to bring the most relevant knowledge pro-actively to the attention of the right people. Each person may have an associated personal agent which functions to serve the knowledge acquisition, knowledge sharing and decision making needs of that person. In particular, bearing in mind that the person forms an "accountable object" within the concept network, the person's personal agent determines information which is relevant to bring to the attention of the person based on one or more of importance, performance, risk, success and action priority values associated with each object in the concept network, and the personal agent pro-actively seeks input from the person concerning the status and completion of tasks.

DETAILED DESCRIPTION OF THE INVENTION

The invention will now be described in greater detail with reference to the attached drawings which show example forms of the invention. It is to be understood that the particularity of the drawings does not supersede the generality of the foregoing description of the invention.

FIGS. 4a and 4b together comprise a single logic flow diagram, and the links labeled A, C, D, E, F, G, H at the bottom of FIG. 4a match the correspondingly labeled links at the top of FIG. 4b.

Modelling Thought

An Enterprise is a collection of objects and intelligent beings bound together through their awareness of a common purpose.

Examples of an enterprise are:
a large corporation
a football team
the crew of a boat
a collection of intelligent agents involved in a manufacturing process.

A concept is a class or set of objects of a certain type.

A concept is used in the enterprise to describe relevant classes of people, things, places and ideas e.g. customers, colleagues, products, goals, countries, locations. Concepts define the "what" of the enterprise (what people, what things, what places) and can be identified by asking "What do we talk about? In relation to what?"

A concept link is defined by an ordered pair of concepts. Each concept link has a specific direction defined by the order of the two concepts, the concepts being designated the source concept and the destination concept of the concept link.

A concept link is a mental connection between two concepts based on experience or a belief that objects in one concept have a direct relationship with objects in the other concept. Concept links are used to define the "why" and "how" of the enterprise, explaining purpose and contribution. For example:

"Why are we doing Projects? To contribute value to Customers and to implement our Strategies"

"How do we create value for Customers? By supplying quality Products and Services"

"How do we deliver Products and Services to Customers? Through Projects"

"How will we achieve our Goals? By implementing our Strategies"

A concept network consists of concepts (nodes) and concept links. Each concept contains multiple objects, and each concept link contains multiple object links.

The process of defining concepts for an enterprise is guided by broad areas of relevance to success for that enterprise. For example, for a commercial enterprise, broad areas of relevance could include direction, markets, environment, strategy, structure, people, activity. Concepts would be defined which relate to each of these areas, to ensure a comprehensive, balanced view of what underpins success.

Figure 11:
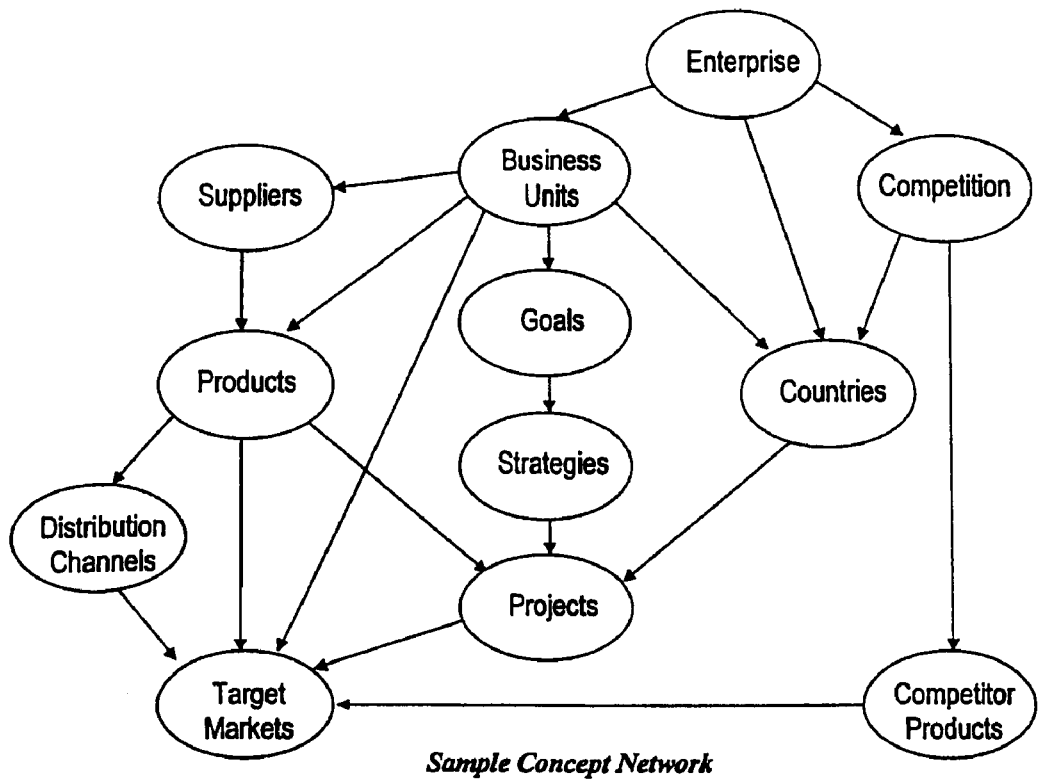
FIG. 11 illustrates a sample concept network.

A sample concept network is shown in FIG. 11.

In the Special case, a concept network includes one and only one origin node which is a source concept for one or more links, but not a destination concept for any links. The origin node is also called the Enterprise concept. In the General case, a concept network can include multiple origin nodes.

If there are multiple origin nodes, there can be multiple concept links between any two concepts, at most one associated with each origin node.

A concept network includes at least one end node, which is a destination concept for one or more links, but not a source concept for any links.

A path is defined in relation to a specific origin node. It is a set of contiguous, non-intersecting concept links associated with the origin node, starting at the origin node and ending at an end node. Contiguous means that the destination concept of one link in the path is the source concept of another link in the path, or an end node. Non-intersecting means that a concept cannot occur more than once in a path.

According to this definition, all of the links in a path have the same direction, radiating outwards from the origin node or Enterprise concept and no path is a subset of another path.

The paths are useful for guiding thought and each defines a contextual framework for every object in the concepts defined in the path.

An object is a specific instance of a concept. A concept is said to contain a set of objects which are of the type defined by the concept.

An object is a specific person, thing, place or idea which belongs to a concept e.g. Customer X, Product P, Country Z, Issue J. Objects define the specific "whats" of the enterprise and can be identified by asking "For example?" in relation to any concept.

An object link is defined by an ordered pair of objects which are contained in a corresponding ordered pair of concepts. An object link can only exist if there is a concept link whose source concept contains the source object and whose destination concept contains the destination object. The object link is said to be within this concept link.

Each object link has a specific direction defined by the order of the two objects, the direction being the same as the direction of the concept link which contains the object link. A source object can be linked to multiple destination objects, and multiple source objects can be linked to one destination object.

If there are multiple origin nodes, there can be multiple object links between any two objects, at most one for each origin node.

An object link is a mental connection between two objects, in two different concepts, that contributes to a concept link between the same two concepts. Object links define the specific "whys" and "hows" of the enterprise. For example:

"Why are we doing Project P? To contribute value to Customer X"

"Why are we implementing Strategy S? Because it will have a major impact on achievement of Goal A and a medium impact on achievement of Goals B and C"

"How will we meet the needs of Customer X? By implementing Projects P, Q and R"

The strategic index of a concept is a measure of the degree to which it focuses thoughts moving along a path towards the origin node. A possible formula for the strategic index of a concept is 1/n where n is the number of objects in the concept.

Suppose all the concepts that describe an enterprise are arranged in descending order of strategic index.

For any concept, the concepts above have the potential (depending on connectivity) to answer the questions "where are we going?" and "why?" The concepts below have the potential to answer the questions "how?", "who?" and "when?".

Flow is defined as the movement of traffic or data along an object link. The direction of flow is defined relative to the direction of the object link: forward (in the same direction), reverse (in the opposite direction) or no flow.

There can be multiple types of flow i.e. multiple types of traffic or data moving along an object link. For a particular type of flow, the direction of flow is a property of the concept link. The concept link defines the direction of flow for that type of flow for all object links within that concept link.

SIPRA is an acronym, the letters of which stand for:
S: Success
I: Importance
P: Performance
R: Risk
A: Action Priority The purpose of SIPRA is to create an enterprise system driven by the objective "to guide you and the enterprise towards success".

Figure 1:
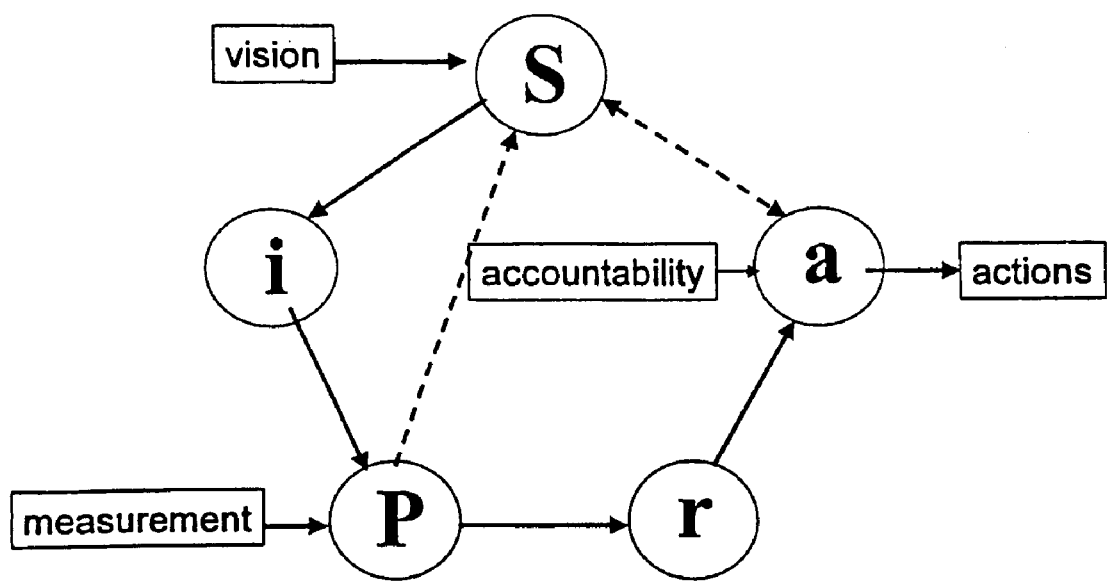
FIG. 1 is a schematic diagram of some broad features of an embodiment of the invention.

The concept of SIPRA, shown in FIG. 1, illustrates:
the vision of success for any enterprise leads to the definition of concepts and objects relevant to success;
the flow of importance between concepts and objects is the basis for thinking strategically and identifying where performance is most critical to success;
the definition and tracking of measures of current and future performance, and the flow of performance between concepts and objects are the basis for determining object performance;
the combination of importance and performance for any object is the basis for determining risk and success contribution by that object; and
personal accountability for objects, their risk and success contribution and an understanding of feasible options are the basis for recommending action priorities, which result in action and reappraisal of success.

A SIPRA concept network is a concept network with three types of flow, called importance, performance and accountability. For each concept link, the direction of flow is defined for each of these three types of flow.

Figure 12:
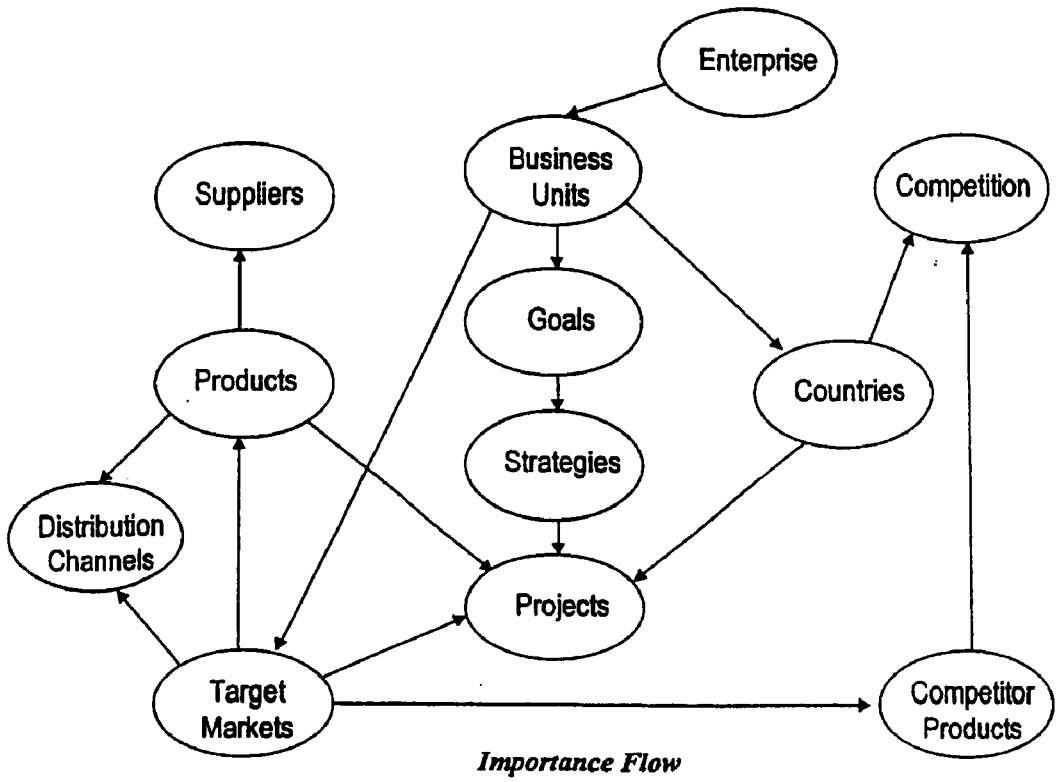
FIG. 12 shows importance flows within the sample concept network of FIG. 11.
Figure 13:
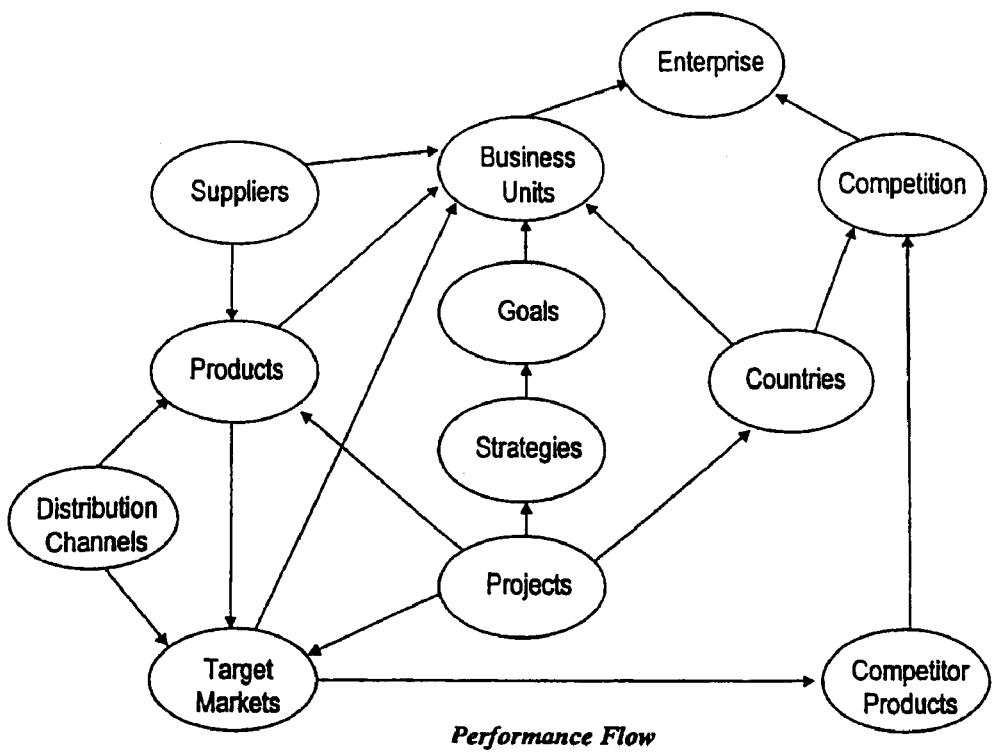
FIG. 13 shows performance flows within the sample concept network of FIG. 11.
Figure 14:
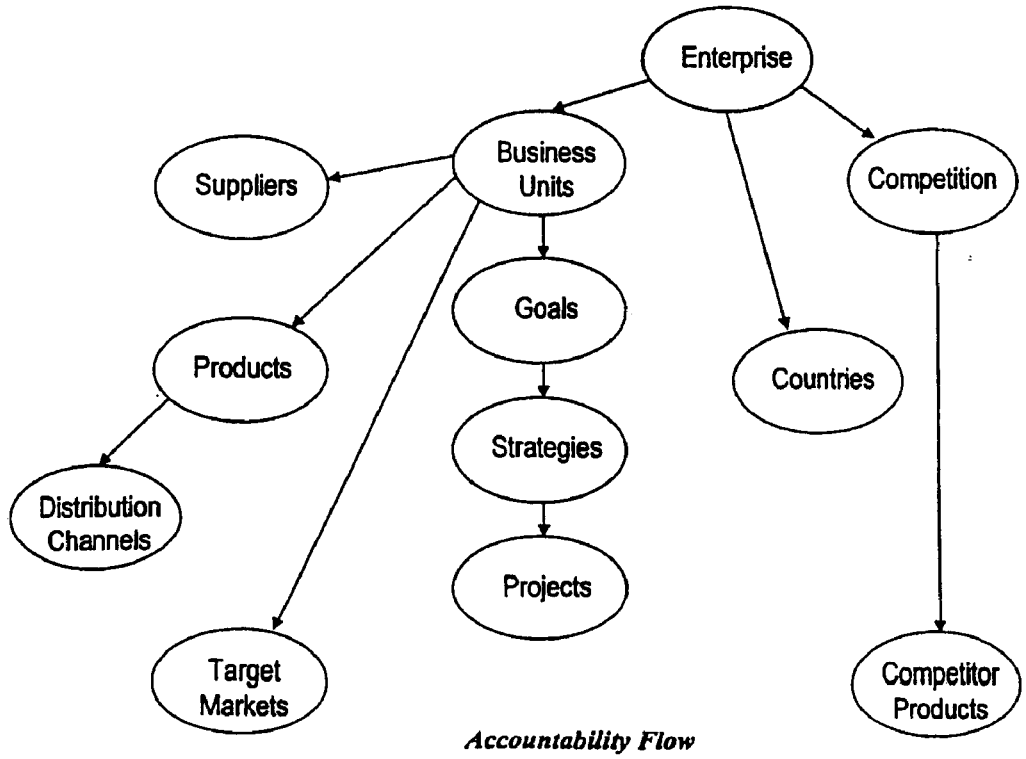
FIG. 14 shows accountability flows within the sample concept network of FIG. 11.

FIGS. 12, 13 and 14 show a sample concept network with the directions of flow for importance, performance and accountability, respectively.

SIPRA is supported by a mathematical model, the subject of this invention, that enables a group of people to extend the scope of their individual experience and awareness, making faster and more balanced decisions and increasing the success of the enterprise and the people associated with that enterprise.

SIPRA involves:
defining a set of concepts that provide a strategic framework for structuring thoughts and describing all of the objects relevant to enterprise success;
defining how everyone associated with the enterprise relates to the strategic framework;
defining enterprise success.

Figure 2:
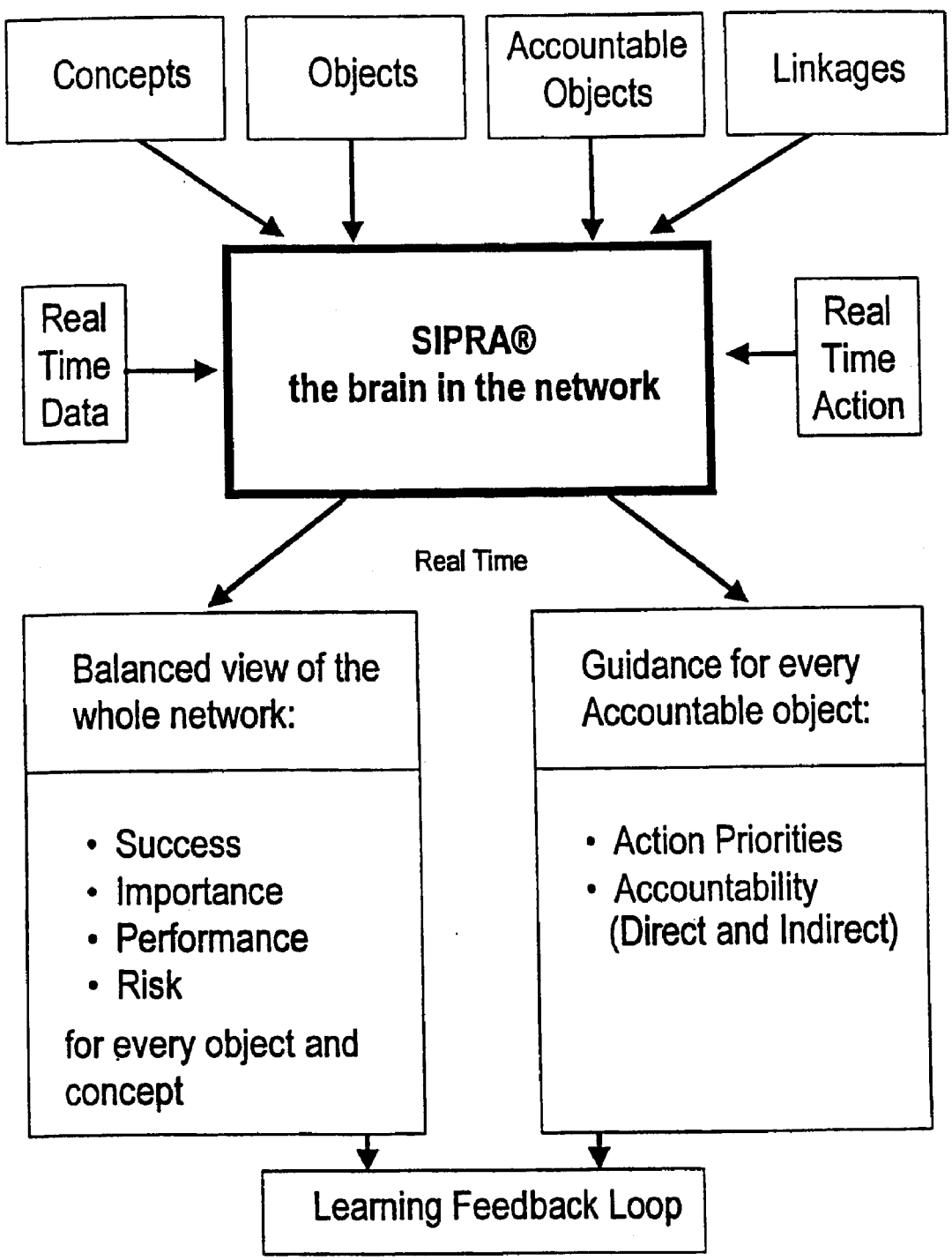
FIG. 2 is a schematic diagram of some inputs and outputs to the system of an embodiment of the invention.
Figure 3:
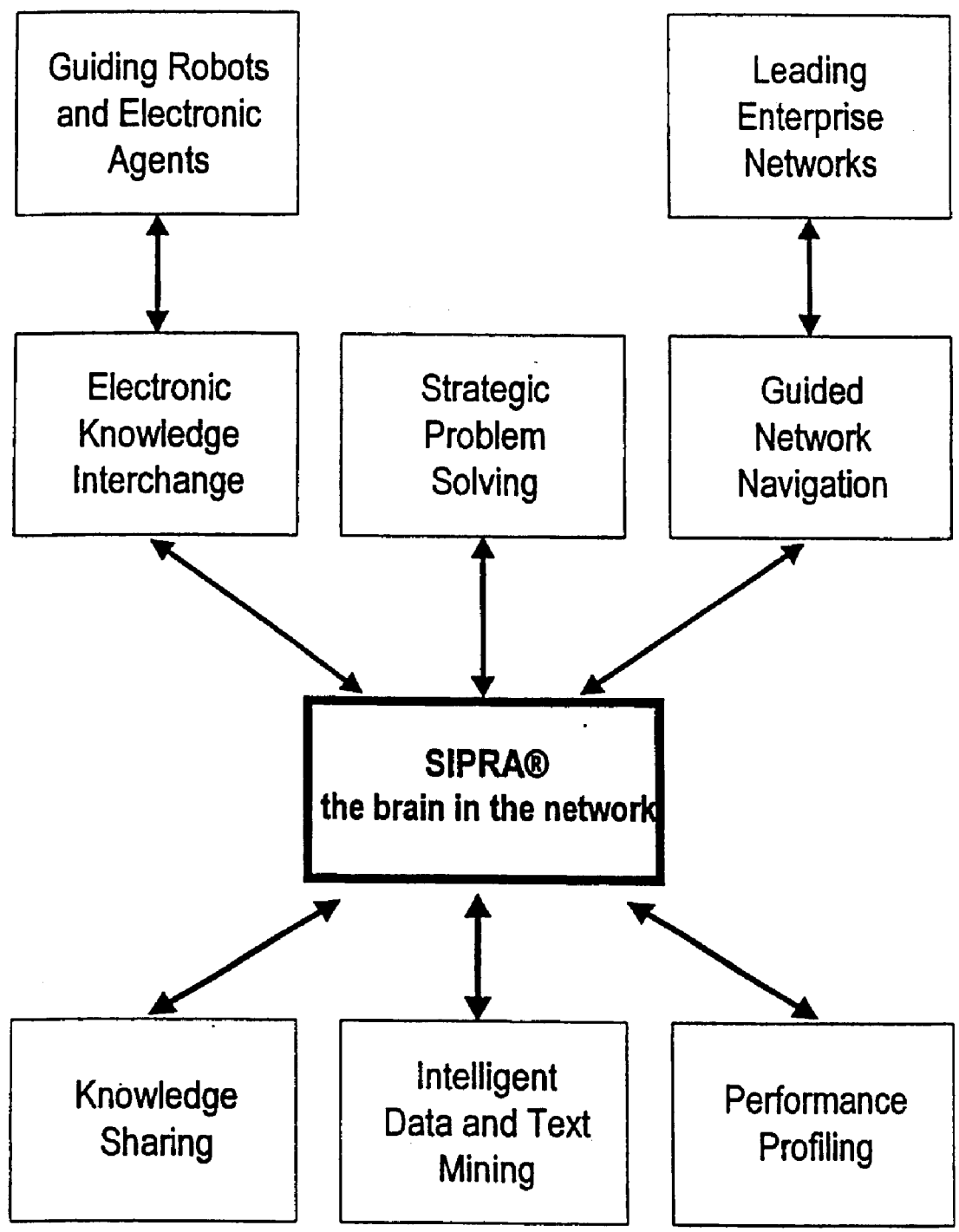
FIG. 3 is a schematic diagram illustrating some applications of the invention.

A system based on SIPRA can guide any enterprise towards success, adapting quickly to any form of change, including a changing definition of success, continuous learning, and the real time unfolding of events and performance. Important potential commercial applications of the invention are illustrated in FIGS. 2 and 3.

A concept link facilitates navigation through the network by enabling the definition of appropriate paths, classification or grouping of objects, and creation of importance, performance and accountability flows through the network, which enable the determination of importance, performance and accountability values for objects.

The strategic pull of one concept on another is a function of the strategic index of each of the concepts, their connectivity (i.e. the degree to which objects in one concept are linked with objects in the other concept) and the direction of importance flow.

In the General case, the concept network can accommodate a multiplicity of inter-connected enterprises, each with its own unique perspective or viewpoint represented by an origin node. For each object, SIPRA determines the SIPRA-values from each perspective, and is able to create a holistic understanding of alignment between multiple enterprises or multiple groups of people with different common desires. The General case is therefore capable of guiding win—win negotiation, and the implementation of optimal solutions involving multiple conflicting or partially aligned groups.

The Special case is a simplification of the General case, used in solving the complex problems associated with aligning and guiding a large enterprise towards one shared vision and a common purpose with a concept network including exactly one origin node, rather than multiple origin nodes. In the Special case, because of this simplification:

a concept link has one set of link properties, rather than multiple sets;

there is only one concept link between any two concepts, defined as an ordered pair of concepts;

there is no facility to correlate the impact of multiple origin nodes or viewpoints; and there is only one set of paths, all of which start at the one origin node.

The Special case can be extended readily to the General case.

Figure 9:
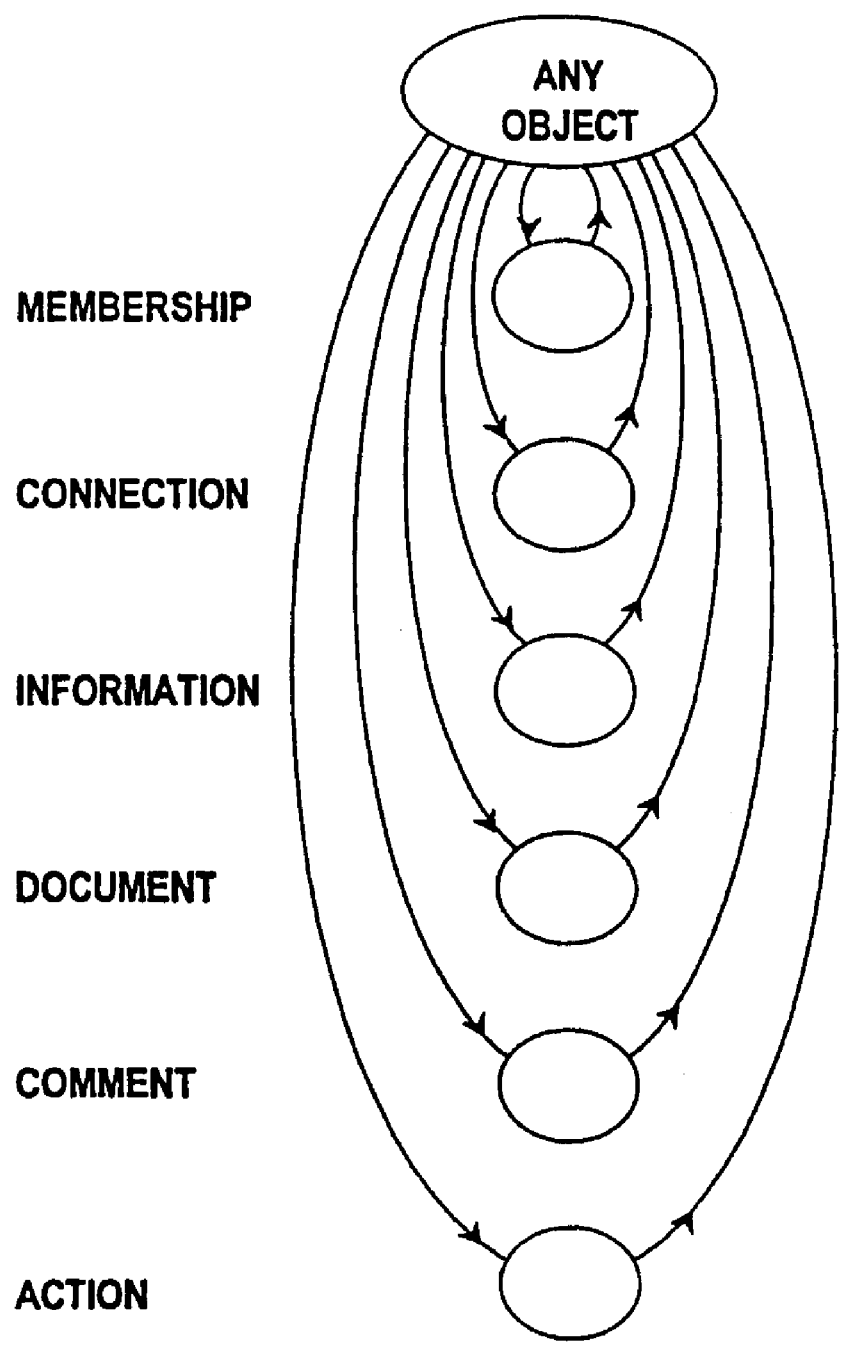
FIG. 9 is a diagram illustrating sample knowledge links and attributes.

Every object in the concept network has a standard set of knowledge attribute and linkage types. These can be varied to suit the application and, without limiting the generality of the invention, sample knowledge attributes and linkages are shown in FIG. 9. These include:

memberships of concepts or other groupings of objects from which is derived inheritance knowledge and the ability to make meaningful comparisons across objects;

connections with other objects, and connections with people who are accountable or relevant to the object or who find the object relevant;

information relating to measures, target, actual and forecast performance information and impact analyses based on interactions between objects and measures;

documents including any forms of electronic images, electronic mail, internet references and software;

comments including ideas, conversations, explanations and collaboration; and actions including delegated tasks, deferred tasks and follow-up reminders.

SIPRA Agents work with one or many SIPRA concept networks, guiding a particular person (or intelligent object) and the enterprise of which they are a part, towards success. They do this by being:

proactive in bringing all relevant knowledge to their person;

available on-line for consultation in real time;

creative and lateral in informing their person of things they need to know;

helpful in recommending courses of action consistent with success;

focused on being effective, and knowing what's important;

connected with the big picture;

continuous in their work for their person, operating at high speed;

forward looking, perceptive and insightful even in the absence of detailed data;

open and non-judgmental in recommending ways to increase personal success and that of the enterprise to which the person belongs;

able to assimilate hard and soft data, analyze in multiple dimensions, highlight significant items and interpret with intelligence;

able to communicate instantaneously across the enterprise; and able to facilitate connections amongst people.

Specifically, in an example commercial application, each SIPRA agent:

has one owner, a person or artificial intelligent object or robot;

delivers three benefits: insight, automation and details;

operates in accordance with the five guiding principles of SIPRA:

success oriented, guiding its person toward success;

importance aware, understanding the relative importance of all objects;

performance boosting, tracking performance and making the person aware of relevant performance issues;

risk minimizing, assessing the relative risk associated with all objects in the concept network; and action prioritizing and motivating, recommending where the person should take action and suggesting actions where possible.

works with seven types of knowledge: concepts, objects, measures, people, comments, actions, news;

displays nine capabilities: strategic thinking, sharing knowledge, sustaining performance, knowing perceptions, making it happen, business intelligence, market intelligence, financial intelligence, resource intelligence.

Figure 8:
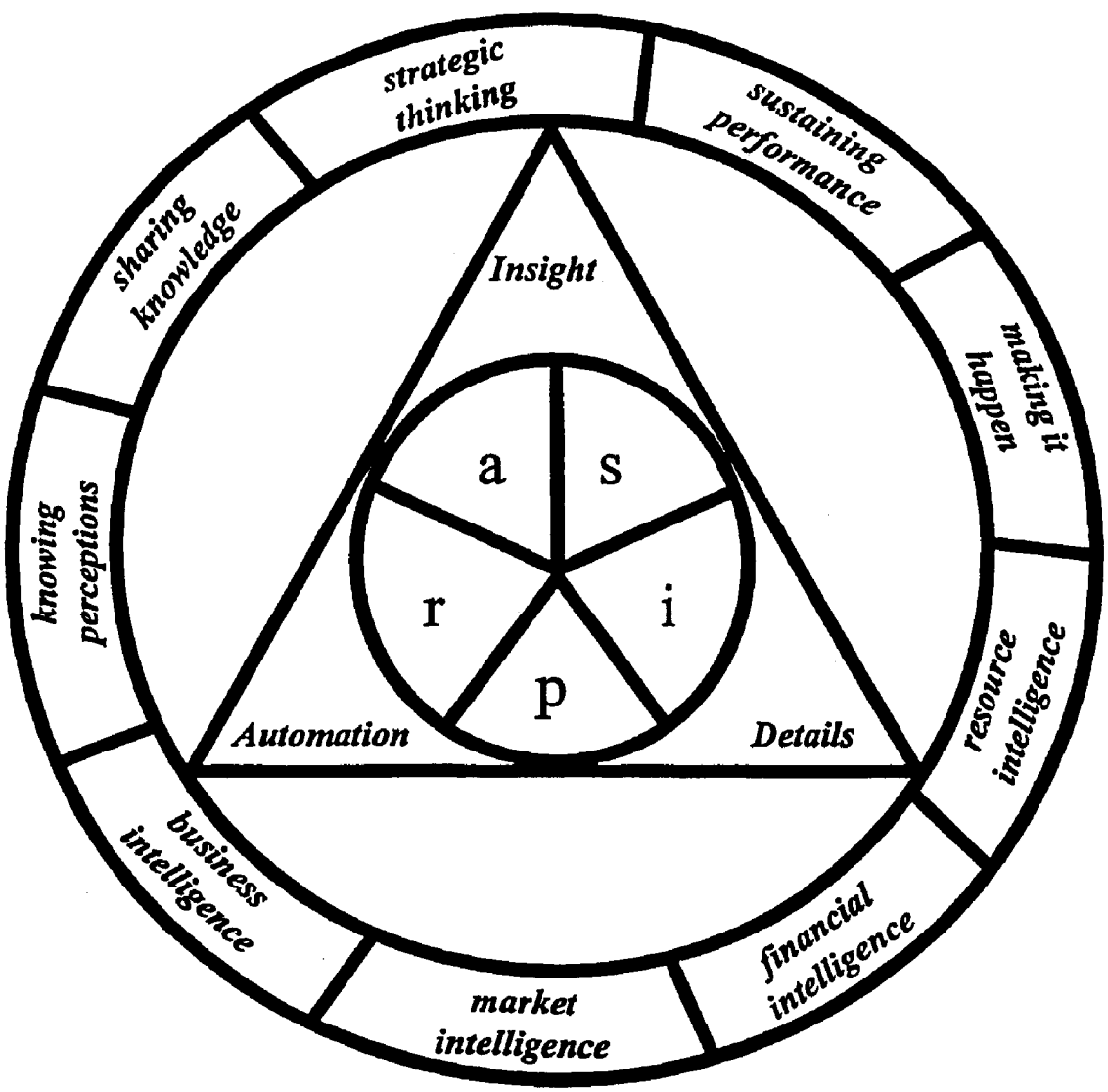
FIG. 8 shows the conceptual architecture of an intelligent personal agent applied to an illustrative commercial application.

The conceptual architecture of a SIPRA agent for this application is shown in FIG. 8.

In order for the commercial solution to reach maximum effectiveness, each person who owns a SIPRA agent needs to:

have ready access to their SIPRA agent;

know how their SIPRA agent can benefit them;

understand the five guiding principles of SIPRA;

work confidently with the seven types of knowledge;

demonstrate a practical understanding of the nine capabilities.

Importance

We can determine the relative importance of objects by considering their connectivity with other concepts.

There may be many different paths connecting the current concept with each origin concept. The importance of each object in each concept, relative to each origin concept, is based upon the combined impact of all such paths.

Imagine a network which has the capacity to conduct a commodity called "importance".

In order to model the flow of importance throughout the network, we will assume a unit of importance enters the network at a node called the origin, and flows to a set of objects, set A, via links which connect the origin with objects in set A. The importance continues to flow to another set B which is connected to set A, via links which connect the objects in set A with the objects in set B.

The links have varying degrees of conductivity or "thickness", and the objects have varying degrees of existence.

The basic processing of importance occurs in accordance with the following procedure:

1. Is it time to recalculate importance?
2. Remove bad relationships
3. Build up a list of concept links, in the correct order for calculating importance
4. In each concept, obtain all objects for the concept below (target concept) and in the current concept (source concept).
5. In the first origin concept, importance=1.0. If there are multiple objects in the first concept, each has an importance of 1.0.
6. In the target concept, go through each object setting importance=0.
7. Find all the parent objects in the source concept and, for each parent, validate the child links.

8. For each parent, get all the children, and accumulate the total link value from parent to all children.
9. If link value not 0 and total link value not 0, use the parent importance to calculate the contribution to child importance associated with this parent:

$$= \frac{\text{Current Link Value}}{\text{Total Link Value}} * \text{importance of parent}$$

10. Accumulate this value for all parents of the selected object, to determine the importance of that object.
11. Keep a running total of importance for all target objects (Old Total). Continue until all objects in the target concept have had their importance value calculated.
12. If there are inward flows of importance from multiple concepts, repeat steps 4 to 10 for each such concept, weighting the importance value by the link weight associated with that concept link, and summing the weighted value into the Old Total.
13. In the target concept, go through each object and find all the objects in this same concept which are influenced by it.
14. Accumulate the importance of all the "dependant" objects, multiplied by the degree of dependency (for itself, the multiplier is 1).
15. If an object has no influence on other objects, use its old importance value as the new importance value.
16. Save the new importance value for each object, and calculate the total of the new importance values for all objects in the concept (New Total).
17. If Old Total=New Total, skip the next step.
18. Loop through the objects, calculating a normalized importance value $$= \text{Stored new importance value} * \frac{\text{Old Total}}{\text{New Total}}$$

19. Store the importance values for all objects associated with the first origin concept; then proceed to Step 5 and process importance for all objects associated with the second origin concept, and so on.

The importance process is used to generate importance values for the objects in any set, T, based on the dynamics of the network connecting T with the origin.

As an introduction to importance calculation logic, let us assume the current concept is called Concept A and that target Concept B is linked to Concept A by a concept link with importance flowing from A to B.

If importance A (i) is the importance value assigned to Object i in Concept A, and Link AB (i, j) is the strength of the connection between Object i in Concept A and Object j in Concept B, then $$\text{Importance } B(j, A) = \sum_i \text{Importance } A(i) * \text{Link } AB(i, j)$$

where Importance B (j, A) is the importance value assigned to Object j in Concept B, based on the link between Concept A and Concept B. (Note: Normalisation has been excluded to simplify the formulae.)

The importance of the objects in Concept B is based on links with all concepts:

$$\text{Importance } B(j, All) = \sum_k \text{Importance } B(i, K) * \text{Weight } A(K)$$

where weight B(K) is the strength of the concept link between Concept K and Concept B, for all Concepts K in which there is a flow of importance from Concept K to Concept B.

In general, the objects in any Concept A may be dependent on one another to some degree, meaning that some of the objects may exert influence on other objects in the same concept.

Let us use the notation Influence A(i, h) to mean the influence, within Concept A, of Object i on Object h, a fuzzy value (from 0 to 1).

Assuming Influence A(i, i) is 1 for all Objects i, it follows that $$\text{Importance } A(i) = \sum_h \text{Importance } A(h, All) * \text{Influence } A(i, h)$$

The formula for influence can be defined to suit the application. The default formula for adjusting the importance values is:

$$i_k = \sum_j inf(k, j) * imp(j)$$

where:
$i_k$ is the adjusted importance of object k
$inf(k,j)$ is the influence of object k on object j
$imp(j)$ is the importance of object j prior to making the adjustment for influence
$inf(k,k)=1.0$ The influence adjustment formula can be applied recursively to take into account the increasingly indirect influences of objects on one another.

In general, the importance of an object is based on:
its direct contribution to the objects in the concepts exerting strategic pull;
its influence on other objects in the same concept; and
their direct contribution to the objects in the concepts exerting strategic pull.

In some situations, the importance values in a concept K with higher strategic index than Concept A may need to be calculated from Concept A, rather than being used in the calculation of importance values within Concept A. This is because Concept K is seen as an aggregation of objects, rather than a strategic driver. In this situation, $$\text{Importance } K(j) = \sum_i \text{Importance } A(i) * \text{Link } AK(i, j)$$

for all Objects i in Concept A.

Using these formulae, it is possible to determine the strategic importance of every object in a network, relative to the common desire of the enterprise.

The importance model can now be extended, taking into account varying contexts and degrees of object existence.

The origin has an importance of 1 i.e. $i_o=1$

If the origin is linked to concept A, and a is an object in concept A, then $/(o,a)$ is the link value between the origin and object a. The importance of object a is $$i_a=/(o,a)$$

where $i_a$ is a real number between 0 and 1

In the process of deriving target concept importances from source concept importances, provided every object in the source concept is linked to an object in the target concept, the total importance is conserved.

$$\sum_{a \varepsilon A} i_a = 1$$

for all concepts A

Figure 5:
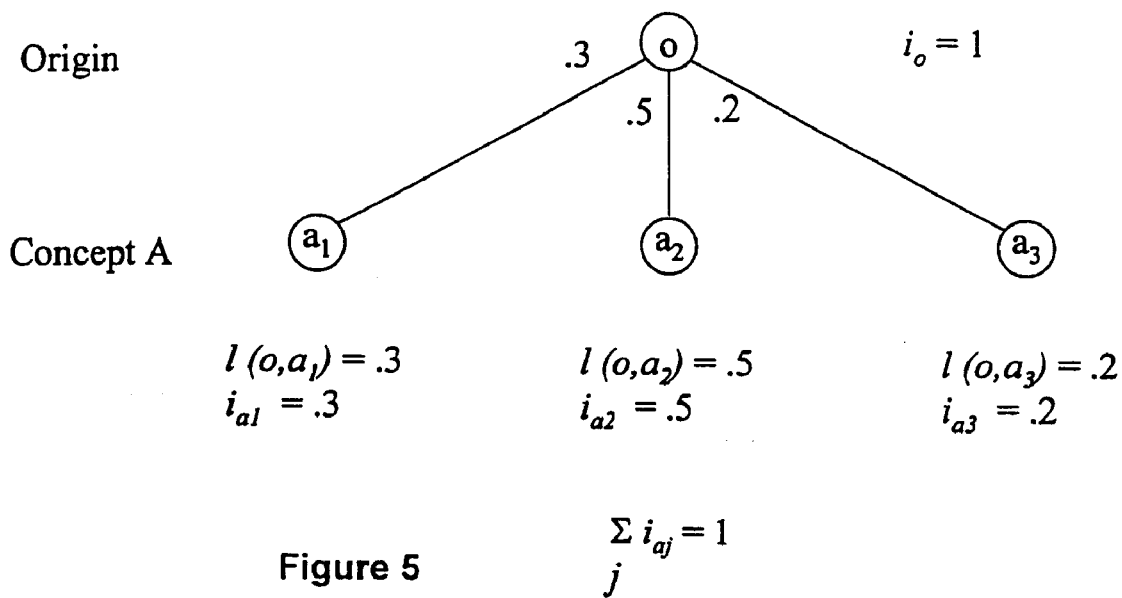
FIGS. 5, 6 and 7 show a diagrammatic worked example of an importance calculation according to an aspect of the invention.

FIG. 5 shows an example which includes the origin and three objects categorised within Concept A, namely $a_1$, $a_2$ and $a_3$. Illustrative link values and importance values are shown.

The sum of the importances across all of the objects may be less than 1.0 if not all the objects in the source concept have a link to an object in the target concept. The sum of the importances across all of the objects in the target concept $$= \frac{\text{Sum of importances for all parents with children}}{\text{Sum importances for all parents}}$$

A network of objects that is changing over time will have new objects appearing and existing objects disappearing in a continuing process of change and adjustment. The degree to which an object exists in any interval of time is not simply "all" or "nothing". In general, in any interval of time an object has a degree of existence that is some value from 0 to 1.

The degree of existence of an object a in concept A is $e_a$, where $e_a$ is a real number between 0 and 1.

Given an expression, referred to as the existence adjustment factor E, where $$E = \frac{1}{\sum_{a \varepsilon A} e_a i_a}$$

and E=0 if $$\sum_{a \varepsilon A} e_a = 0$$

if the objects a in concept A have a degree of existence, $e_a$, then the importance of an object a in concept A is:

$$i_a = E e_a /(o,a)$$

Figure 6:
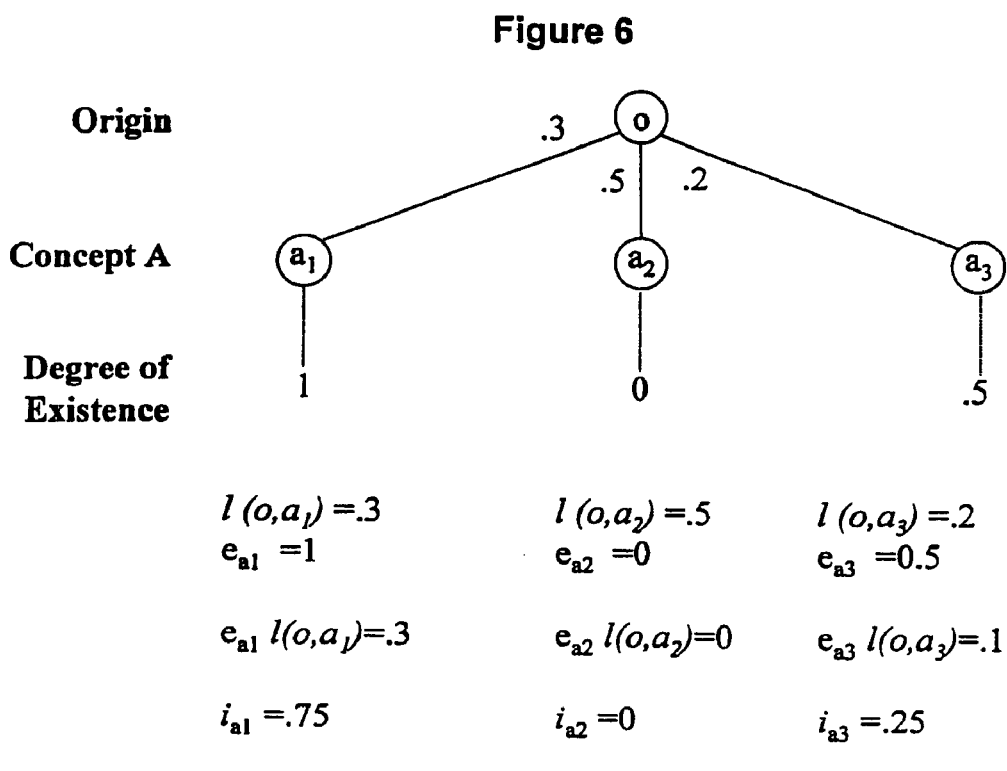

FIG. 6 shows an example which extends FIG. 5 with values for Degree of Existence $e_a$ and a calculated existence adjustment factor E.

Figure 7:
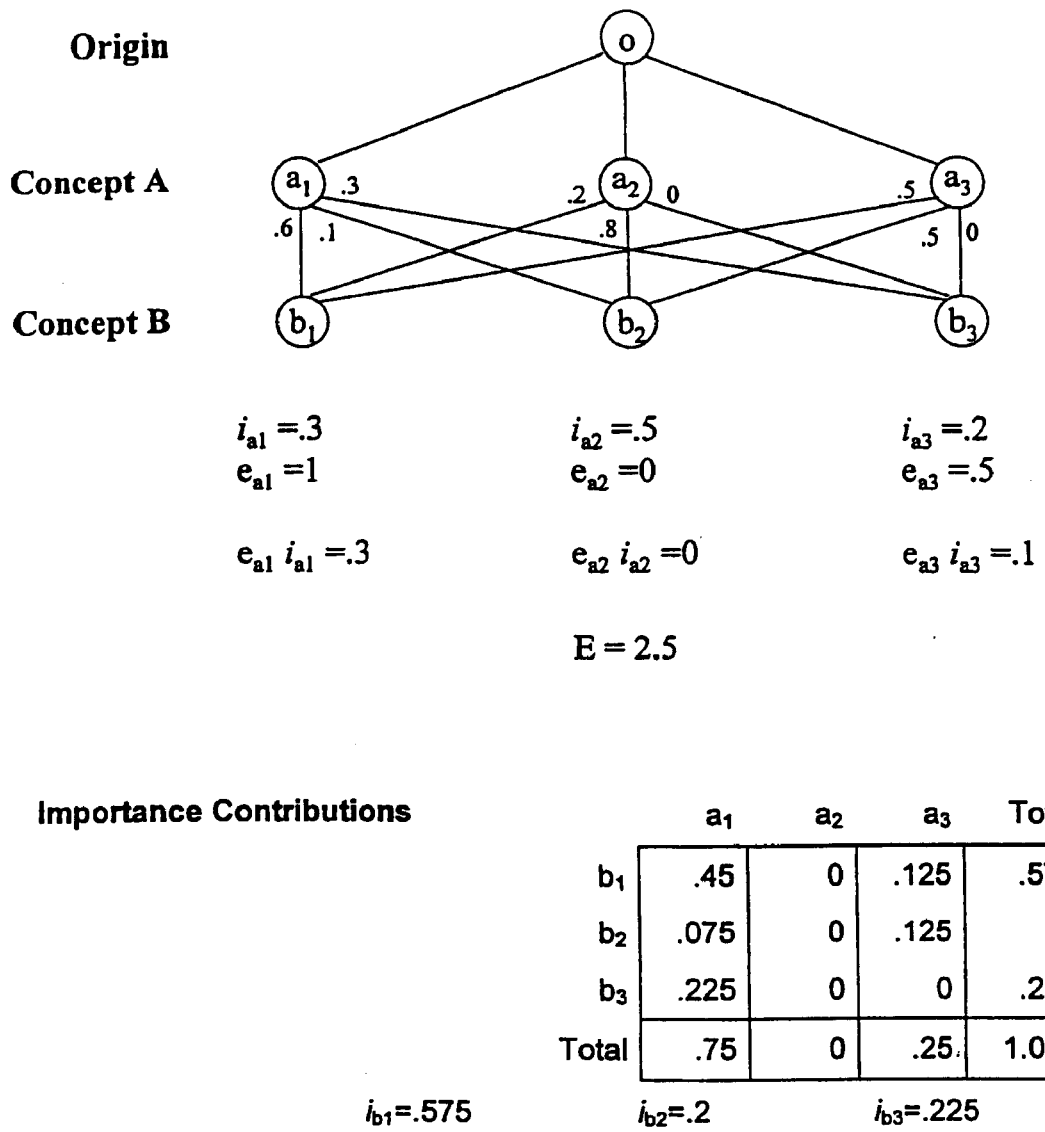

FIG. 7 shows a further developed version of the illustration of FIGS. 5 and 6. In this case, a further concept, Concept B has been introduced, represented by objects $b_1$, $b_2$ and $b_3$. FIG. 7 includes a table of importance contributions, showing the importance contributions of each object a to each object b.

If concept A is linked to concept B, and a is an object in concept A and b is an object in concept B, then $/(a, b)$ is the link value between objects a and b.

The importance contribution of object a to object b is $$i(a,b)=E/(a,b)e_a i_a$$

The importance of an object b in concept B is $$i_b = E \sum_{a \varepsilon A} l(a, b) e_a i_a$$

Given that there is an origin, O, and a set, T, of target objects, and one or more sets of objects which define the network linkages, N, connecting O with T, then:

the context of set T is the set of all sets of objects, N, which define the network linkages connecting O with T the target connection layer, TC, is the set of objects in the context N which have direct linkages with the objects in set T the origin connection layer, OC, is the set of objects in the context N which have direct linkages with the origin.

In the simplest case, the context N does not exist, and the origin O links directly to set T (see FIG. 5).

In the next simplest case, the target connection layer TC is also the origin connection layer OC (see FIG. 7).

In the generalised case, there are one or more layers between the target connection layer and the origin connection layer. The target connection layer TC is disjoint from, and links directly or indirectly with, the origin connection layer OC. The process illustrated in FIGS. 5 through 7, is applied in a recursive manner, flowing importance through the network to the target set.

The target set need not be defined as a fixed set. It is the set that is currently linked to the target connection layer. With each recursion, the target set becomes part of the context, becoming the target connection layer for the next target set. In this way, there is no limit to the number of layers in the context, the context can keep expanding as the target set keeps moving, and the path can change direction with each recursion, depending upon which target set is selected next. This is how strategic thinking is modelled in the computer.

Performance, Risk and Success Contribution

The performance of an object is based on a defined set of measures, and actual/forecast observations of these measures over time compared with target values or objectives. These values can be compared to determine an indication of performance which, when combined with the importance of the object, can be used to determine the success contribution and risk impact of the object on the success of the enterprise as a whole.

In order to track performance, each concept has a set of measure types, and each measure type has a set of measures associated with that measure type, and there are links of variable strength between each concept and the associated measure types.

Each object in the concept inherits the measure types and measures from the concept to which it belongs.

Each object has links of variable strength with the measure types, and for each object each measure type has links of variable strength with the measures associated with that measure type.

The basic processing of performance, risk and success occurs in accordance with the following procedure:

1. Is it time to recalculate performance?
2. Make sure importance calculated first
3. Remove performance values for all current and future intervals
4. Build up a list of concept links, in the correct order for calculating performance
5. Load any external measure data
6. If the concept has the state change property, then generate the progress performance of each object in the concept, saving the result in the state change progress measure. If the concept has the perception property, then generate the perception performance of each object in the concept, saving the results in the perception measures.
7. For each target concept, get a list of concepts (source concepts) for which performance flows into the target concept.
8. Obtain all objects in the source concept. Consolidate the performance for each object in target concept from all the objects to which they are linked in the source concept and save the resulting value in the performance measure in the target concept called 'source concept' performance.
9. Repeat step 8 for all source concepts.
10. For each object in the target concept, generate performance, risk and success values for each measure in each current and future time interval.

Two types of performance will be considered, steady state and directional. In steady state performance measurement, there is no improvement target. The objective is to maintain performance at a certain level.

For example, in manufacturing washers, the size of washers may vary around a mean diameter. If a washer is too small or too large it may be rejected. The objective could be to keep the rejection rate at 1% or less. Product quality is judged for a specific washer; process quality is for a sample of significant size. Continuous performance measurement relates to process quality.

Two critical points need to be defined, at which the level of rejections is judged to be very poor (e.g. 1.5%), target (say 0.5%) and excellent (e.g. close to zero, say 0.2%).

The following variables can now be defined:

Performance (P) is the measured value of performance, e.g. an actual rejection rate of 1.1% for the month.

Normalised Performance (p) is the normalised measure of performance, in which the very low performance limit is 0 (e.g. 1.5%), and the target performance is 100 (e.g. 0.5%) and the performance value is graduated between these two limits (e.g. 1.1% rejection rate becomes 40%).

Performance judgment is the subjective interpretation of the normalised performance (e.g. 40% is "poor", 95% is "OK" or "on track", 120% is "very strong" or "exceptional"). These judgments can be expressed through any appropriate selection of colours e.g. 95+% is green, 60 to 95% is orange, 0 to 60% is red, with all intermediate values corresponding to varying degrees of green, orange and red.

With directional performance, there is a specific time frame within which the performance value must improve from a "base" value to a "target value"

For example, a project is 20% complete at the planned start date, and it must be 100% complete by the planned finish date. Normalised performance will set 20% progress to a value of zero and 100% complete at the finish date to a value of 100. A progress value of 40% would result in a normalised performance value of 25%.

As another example, sales this year from new business are targeted to be $6 million. Normalised performance will set zero sales to a value of zero and $6 million sales to a value of 100. Cumulative sales to a value of $4 million at the target date will result in a normalised performance value of 66.7%.

Figure 10:
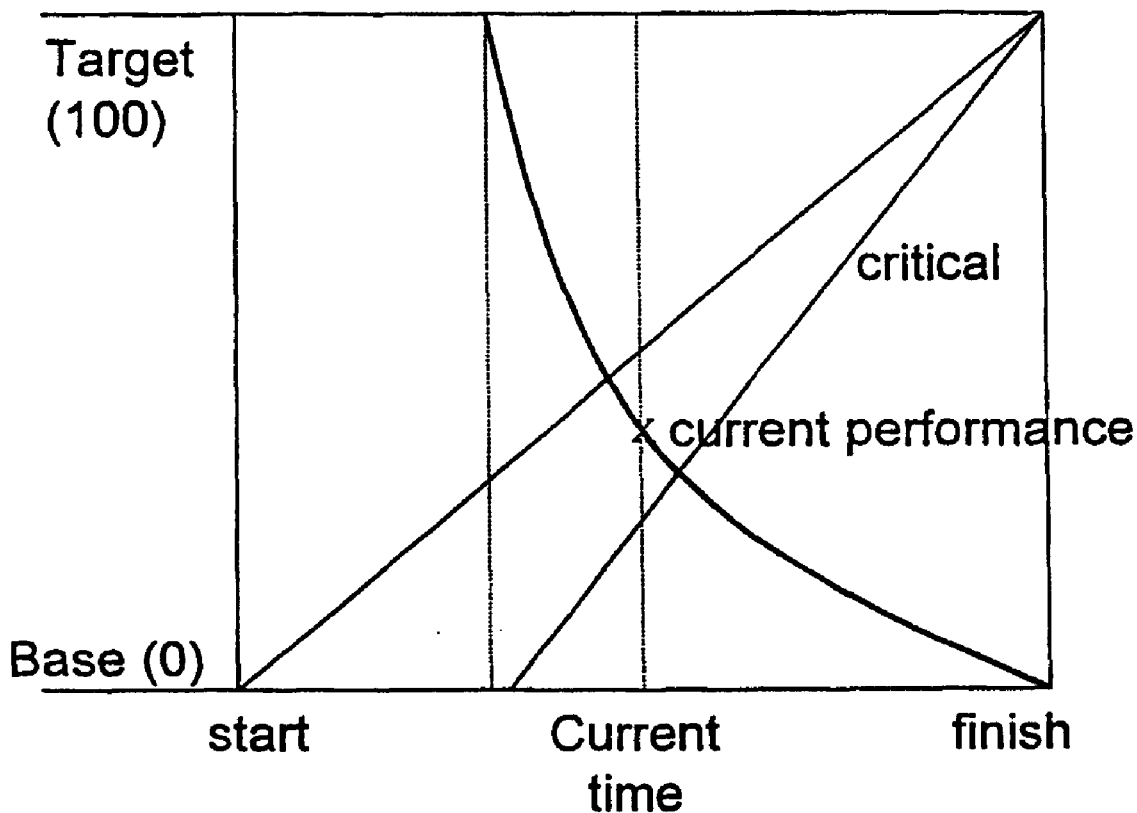
FIG. 10 shows an example of performance measurement, normalized through the use of radians.

As one example of how performance can be measured, it can be normalized through the use of radians, as shown in FIG. 10.

The performance values must converge to the target value by the finish time. The critical line indicates the level below which performance must not fall at any time if the performance target is to be achieved.

A circle with the origin (target, finish) is drawn through the current performance point. The point where the circle intersects the critical line has a normalised performance value of 0. The point where the circle intersects the target line has a normalised performance value of 100. All points on the straight line connecting (base, start) and (target, finish) have a normalised performance value of 50. Alternatively, the point where the circle intersects the target line has a normalized performance value of 200, and all points on the straight line connecting (base, start) and (target, finish) have a normalized performance value of 100.

Performance is measured at any points in time, and in any time intervals, including past, present and future times.

Each concept network has a time importance profile which defines the relative weight or importance of performance, risk and success values over time.

Each measure in any time interval has three associated values, actual/forecast, target and base that are used in the determination of performance assessments.

Performance has valid definition only from the start time (the earlier of planned start and actual start time) to the finish time (the later of planned finish time and actual finish time) of an objective. Outside this time frame, the performance measurement objective does not exist.

Performance objectives only exist within a time frame, specific to an object. When multiple performance objectives are considered, at a point in time, which objectives exist will depend on whether the point in time is within their time frame.

Similarly, if multiple performance objectives are considered within a defined time interval, the degree of existence of each objective will depend upon the percentage of each objective's time frame that falls within the defined time interval.

The importance, prioritization and consolidation of performance objectives is dependent upon their existence, so it is necessary to define the time or time interval whenever the concept network involves performance objectives.

Each measure has a "desired direction of movement" (MDD) property, which can have any one of five settings:
  maximum increases are desired (Favorable)
  staying under an upper limit (Less than)
  maximum decreases are desired (Unfavorable)
  staying above a lower limit (Greater than)
  staying within tolerances of a target value(Tracking).

Each measure is associated with a derivation type, depending upon the way in which the actual/forecast value is derived. These derivation types include:
  a perception measure, which is derived through a network of questionnaires, questions, respondents, respondent weightings;

a state change measure, which is derived through a network of phases, components and milestones, each milestone having progress values, milestone status, milestone planned completion date, milestone actual/forecast completion date;

a summary measure, which is derived through the summation or averaging of one or more transaction or measurement values;

a "Concept X performance" measure for Object j in Concept Y, which is derived through the consolidation of the performance values of all objects which are in Concept X and connected with Object j, where there is a concept link between Concept X and Concept Y, and a performance flow from Concept X to Concept Y;

a calculated measure, which is derived through any mathematical combination of measures.

Figure 15:
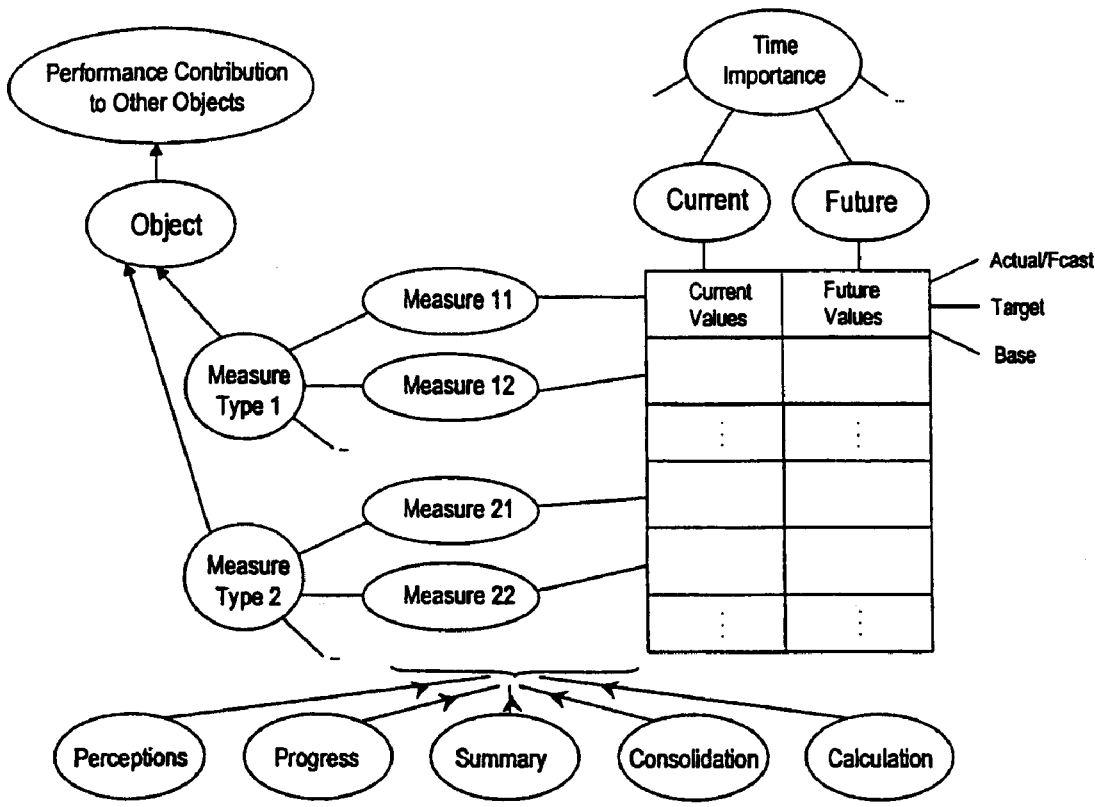
FIG. 15 illustrates the connection of objects, measure types and measures over time.
Figure 16:
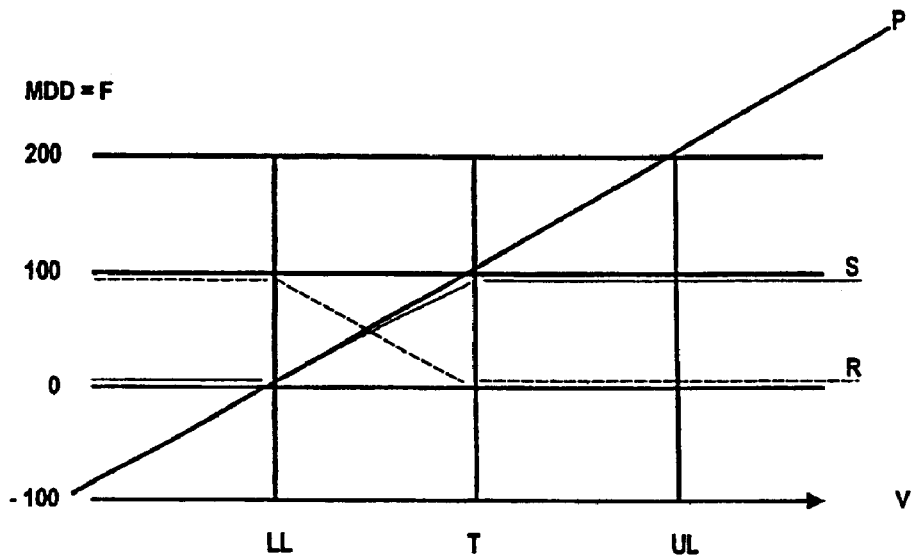
FIGS. 16 to 20 illustrate the five different types of desired direction of movement (MDD).
Figure 17:
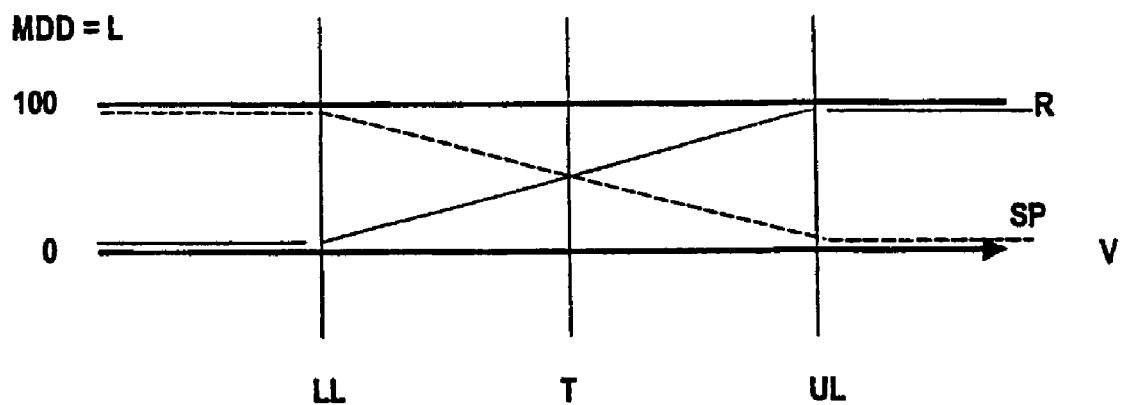
Figure 18:
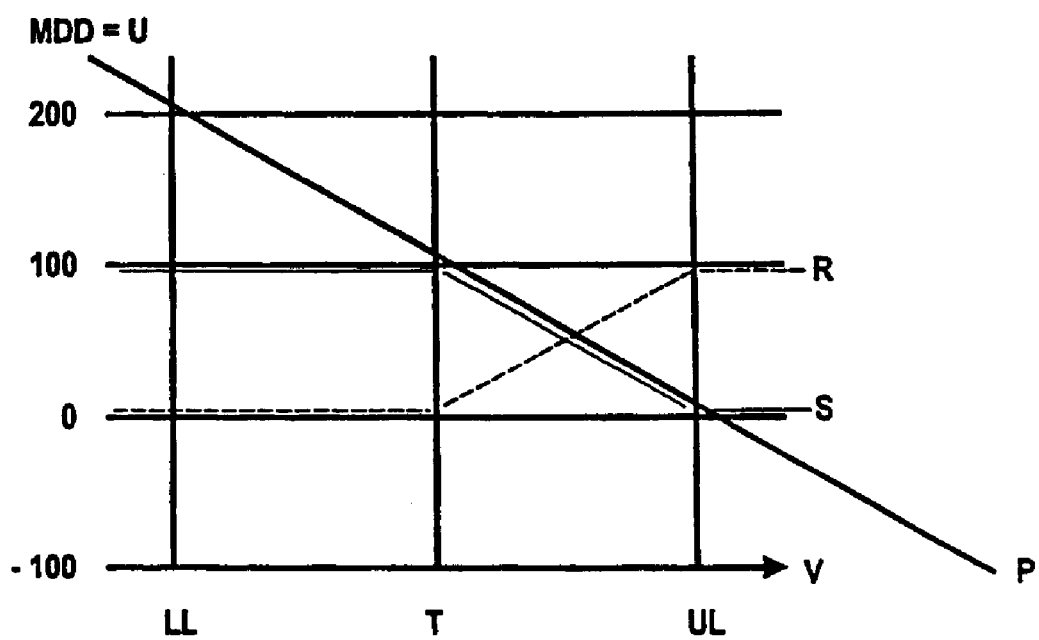
Figure 19:
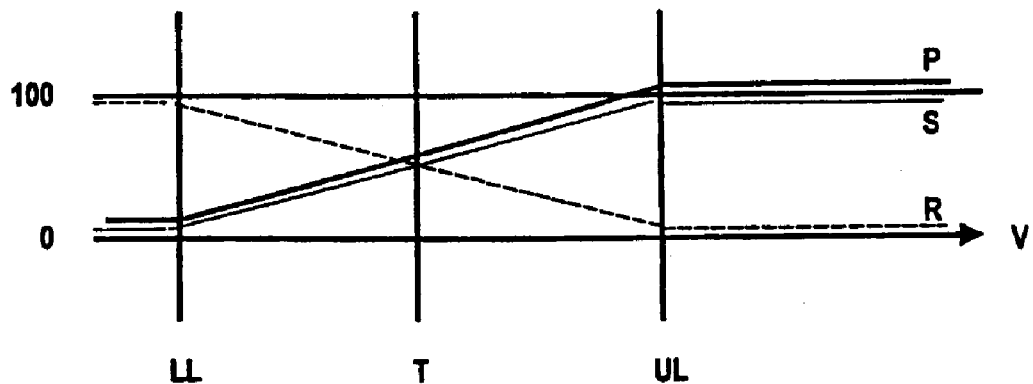
Figure 20:
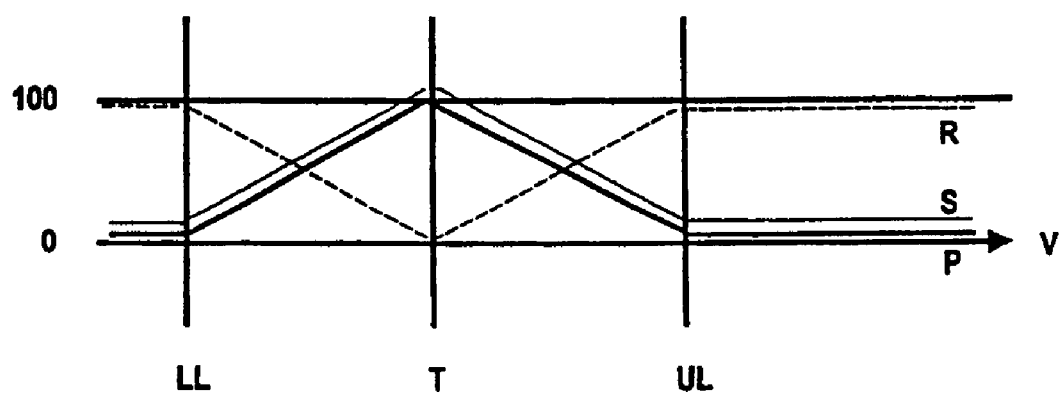

The connection of objects, measure types and measures over time is shown in FIG. 15.

Each concept and measure type combination has properties which define the data source e.g. perception, state change and summary measures may relate to a specific segment of a specified database; "Concept X performance" measures are determined through an analysis of the concept network, calculated measures have a mathematical expression involving specified measures.

Each object and measure combination may have properties, if relevant, which define the data reference within the data source e.g. an identification number.

For each measure and object combination, the system requires achieved values (i.e. measures of current achievement) at an appropriate frequency.

Based on this data, the system calculates a performance rating for each measure and object combination, and then uses the weights to calculate a weighted performance value for the object.

Similar calculations are carried out:

excluding all measures with negative performance ratings to calculate the success contribution of the object; and excluding all measures which are 100% on track or better to calculate the risk contribution of the object.

At a point in time t, the performance of an object j in Concept J is a function of:

the measure types and measures associated with Concept J;

the strength of the links between object j and these measure types;

the strength of the links between these measure types and the associated measures;

the relative importance or weight of each time interval in the assessment of performance, risk and success in time interval t;

the actual/forecast value, target value (i.e. objective) and base value associated with each measure in each time interval that is relevant to the assessment of performance in time interval t;

the MDD property of each measure; and the performance of all objects in all Concepts which have a concept link with Concept J and for which the flow of performance is from that other concept to Concept J.

The generalized performance assessment method defined below enables the performance, success contribution and risk of an object to be assessed using any combination of measures, measure types and fuzzy rules.

The method can be applied to all types of data, all types of targets and objectives, over any time-frames.

For a measure k in time interval x, being observed at time t, assume the actual/forecast performance has a value v. The value is translated into three values: p (measure performance), s (measure success) and r (measure risk) depending upon the target value, upper and lower limits on the target value (UL and LL) and the MDD function. The MDD function can be defined in any way required to model a performance guidance system. The example used to illustrate the MDD function has five types (F=favourable, L=less than, U=unfavourable, G=greater than, T=tracking) and, for each type, there is a formula which defines p, s and r as a function of v. The five types of MDD in this example are illustrated in FIGS. 16 through 20, respectively.

Given a target value T, an upper limit percentage UL % and a lower limit percentage LL %, then the upper and lower limits, UL and LL respectively, are:

UL=T (1+UL % *SGN(T))

LL=T (1−LL % *SGN(T))

Given a base value B and a reference value X (where X=0 initially), then:

if MDD=F, B≠0 and B>T then MDD=U;

if MDD=U, B≠0 and B<T then MDD=F;

if MDD=F, T<0 and B=0, then X=2*T;

if MDD=U, T>0 and B=0 then X=2*T;

if MDD=F, B≠0 and B<T, then X=B;

if MDD=U, B≠0 and B>T, then X=B.

Given the expressions:

$$A = \frac{v - X}{T - X}$$

$$B = \frac{v - LL}{T - LL}$$

$$C = \frac{v - LL}{UL - LL}$$

$$D = \frac{v - UL}{T - UL}$$

the table below summarizes the performance, success and risk calculations for all conditions:

| Value Condition | Desired Direction of Movement (MDD Value) | | | | |
|---|---|---|---|---|---|
| | F | L | U | G | T |
| V > UL | p > 100 | p = 0 | p < 100 | p = 100 | p = 0 |
| | p = {A} | s = 0 | p = {A} | s = 100 | s = 0 |
| | s = 100 | r = 100 | s = 0 | r = 0 | r = 100 |
| | r = 0 | | r = 100 | | |

-continued

| Value Condition | Desired Direction of Movement (MDD Value) | | | | |
|---|---|---|---|---|---|
| | F | L | U | G | T |
| T < V < UL | p > 100<br>p = {A}<br>s = 100<br>r = 0 | 0 < r < 100<br>r = {C}<br>s = 100 − r<br>p = s | 0 < p < 100<br>p = {A}<br>0 < s < 100<br>s = {B}<br>r = 100 − s | 0 < s < 100<br>s = p{C}<br>r = 100 − s<br>p = s | 0 < s < 100<br>s = p{D}<br>r = 100 − s<br>p = s |
| V = T | p = 100<br>s = 100<br>r = 0 | 0 < r < 100<br>r = {C}<br>s = 100 − r<br>p = s | p = 100<br>s = 100<br>r = 0 | 0 < s < 100<br>s = p{C}<br>r = 100 − s<br>p = s | p = 100<br>s = 100<br>r = 0 |
| LL < V < T | 0 < p < 100<br>p = {A}<br>0 < s < 100<br>s = {B}<br>r = 100 − s | 0 < r < 100<br>r = {C}<br>s = 100 − r<br>p = s | p > 100<br>p = {A}<br>s = 100<br>r = 0 | 0 < s < 100<br>s = {C}<br>r = 100 − s<br>p = s | 0 < s < 100<br>s = {B}<br>r = 100 − s<br>p = s |
| V < LL | p < 0<br>p = {A}<br>s = 0<br>r = 100 | p = 100<br>s = 100<br>r = 0 | p > 100<br>p = {A}<br>s = 100<br>r = 0 | p = 0<br>s = 0<br>r = 100 | p = 0<br>s = 0<br>r = 100 |

Worked examples, which derive values for p, s and r for a variety of T, UL and LL values for each of the MDD types, are shown in the following tables:

TABLE 1

Example with MDD = F

| | v | working | | p | s | r |
|---|---|---|---|---|---|---|
| T = 200 | 0 | p = 0/200 | | 0 | 0 | 100 |
| UL% = 5, LL% = 8 | 85 | p = 85/200 | | 42.5 | 0 | 100 |
| UL = T (1 + UL%) = 210 | 190 | p = 190/200, | $s = \frac{(190 - 184)}{(200 - 184)}$ | 95 | 37.5 | 62.5 |
| LL = T (1 − LL%) = 184 | 200 | p = 200/200 | | 100 | 100 | 0 |
| B = 0 | 207 | p = 207/200 | | 103.5 | 100 | 0 |
| X = 0 | 390 | p = 390/200 | | 195 | 100 | 0 |
| B = 60 | 0 | $p = \frac{(0 - 60)}{(200 - 60)}$ | | −43 | 0 | 100 |
| X = 60 | 85 | $p = \frac{(85 - 60)}{(200 - 60)}$ | | 18 | 0 | 100 |
| | 190 | $p = \frac{(190 - 60)}{(200 - 60)}$ | $s = \frac{(190 - 184)}{(200 - 184)}$ | 93 | 37.5 | 62.5 |
| | 200 | $p = \frac{(200 - 60)}{(200 - 60)}$ | | 100 | 100 | 0 |
| | 207 | $p = \frac{(207 - 60)}{(200 - 60)}$ | | 105 | 100 | 0 |
| | 390 | $p = \frac{(390 - 60)}{(200 - 60)}$ | | 236 | 100 | 0 |
| T = −300 | 0 | $p = \frac{600}{-300 + 600}$ | | 200 | 100 | 0 |
| UL% = 5, LL% = 8 | −130 | $p = \frac{-130 + 600}{300}$ | | 157 | 100 | 0 |
| UL = T (1 − UL%) = −285 | −290 | $p = \frac{310}{300}$ | | 103 | 100 | 0 |

TABLE 1-continued

Example with MDD = F

| | v | working | | p | s | r |
|---|---|---|---|---|---|---|
| LL = T (1 + LL%) = −324 | −300 | | | 100 | 100 | 0 |
| B = 0 | −310 | $p = \dfrac{290}{300}$ | $s = \dfrac{-310 + 324}{-300 + 324}$ | 97 | 58 | 42 |
| X = 2 * T = −600 | −500 | $p = \dfrac{-500 + 600}{300}$ | | 33 | 0 | 100 |
| B = −400 | 0 | $p = \dfrac{400}{100}$ | | 400 | 100 | 0 |
| X = −400 | −130 | $p = \dfrac{-130 + 400}{-300 + 400}$ | | 270 | 100 | 0 |
| | −290 | $p = \dfrac{-290 + 400}{-300 + 400}$ | | 110 | 100 | 0 |
| | −300 | | | 100 | 100 | 0 |
| | −310 | $p = \dfrac{-130 + 400}{-300 + 400}$ | $s = \dfrac{-310 + 324}{-300 + 324}$ | 90 | 58 | 42 |
| | −500 | $p = \dfrac{-500 + 400}{-300 + 400}$ | | −100 | 0 | 100 |

TABLE 2

Example with MDD = U

| | v | working | | p | s | r |
|---|---|---|---|---|---|---|
| T = 200 | 0 | $p = \dfrac{-400}{200 - 400}$ | | 200 | 100 | 0 |
| UL% = 5, LL% = 8 | 85 | $p = \dfrac{85 - 400}{200 - 400}$ | | 158 | 100 | 0 |
| UL = T(1 + UL%) = 210 | 190 | $p = \dfrac{190 - 400}{200 - 400}$ | | 105 | 100 | 0 |
| LL = T(1 − LL%) = 184 | 200 | p = 100 | | 100 | 100 | 0 |
| B = 0 | 207 | $p = \dfrac{207 - 400}{200 - 400}$ | $s = \dfrac{207 - 210}{200 - 210}$ | 97 | 30 | 70 |
| X = 400 | 390 | $p = \dfrac{390 - 400}{-200}$ | | 5 | 0 | 100 |
| B = 350 | 0 | $p = \dfrac{-350}{200 - 350}$ | | 233 | 100 | 0 |
| X = 350 | 85 | $p = \dfrac{85 - 350}{200 - 350}$ | | 177 | 100 | 0 |
| | 190 | $p = \dfrac{190 - 350}{200 - 350}$ | | 107 | 100 | 0 |
| | 200 | p = 100 | | 100 | 100 | 0 |
| | 207 | $p = \dfrac{207 - 350}{200 - 350}$ | $s = \dfrac{207 - 210}{200 - 210}$ | 95 | 30 | 70 |
| | 390 | $p = \dfrac{290 - 350}{200 - 350}$ | | −27 | 0 | 100 |

TABLE 2-continued

Example with MDD = U

| | v | working | | p | s | r |
|---|---|---|---|---|---|---|
| T = −300 | 0 | p = 0 | | 0 | 0 | 100 |
| UL% = 5, LL% = 8 | −130 | $p = \dfrac{-130 - 0}{-300 - 0}$ | | 43 | 0 | 100 |
| UL = T(1 − UL%) = −285 | −290 | $p = \dfrac{-290}{-300}$ | $s \dfrac{-290 + 285}{-300 + 285}$ | 97 | 33 | 67 |
| LL = T(1 + LL%) = −324 | −300 | p = 100 | | 100 | 100 | 0 |
| B = 0 | −310 | $p = \dfrac{-310}{-300}$ | | 103 | 100 | 0 |
| X = 0 | −500 | $p = \dfrac{-500^*}{-300}$ | | 167 | 100 | 0 |
| B = −150 | 0 | $p = \dfrac{150}{-300 + 150}$ | | −100 | 0 | 100 |
| X = −150 | −130 | $p = \dfrac{-130 + 150}{-300 + 150}$ | | −13 | 0 | 100 |
| | −290 | $p = \dfrac{-290 + 150}{-300 + 150}$ | $s \dfrac{-290 + 285}{-300 + 285}$ | 93 | 33 | 67 |
| | −300 | p = 100 | | 100 | 100 | 0 |
| | −310 | $p = \dfrac{-310 + 150}{-300 + 150}$ | | 107 | 100 | 0 |
| | −500 | $p = \dfrac{-500 + 150}{-300 + 150}$ | | 233 | 100 | 0 |

TABLE 3

Example with MDD = L

| | v | working | p | s | r |
|---|---|---|---|---|---|
| T = 200 | 0 | V < LL | 100 | 100 | 0 |
| UL% = 5, LL% = 8 | 85 | V < LL | 100 | 100 | 0 |
| UL = T (1 + UL%) = 210 | 190 | $p = \dfrac{-310}{-300}$ | 77 | 77 | 23 |
| LL = T(1 − LL%) = 184 | 200 | $r = \dfrac{200 - 184}{210 - 184}$ | 38 | 38 | 62 |
| | 207 | $r = \dfrac{207 - 184}{210 - 184}$ | 12 | 12 | 88 |
| | 390 | V > UL | 0 | 0 | 100 |
| T = −300 | 0 | V > UL | 0 | 0 | 100 |
| UL% = 5, LL% = −285 | −130 | V > UL | 0 | 0 | 100 |
| LL = T(1 + LL%) = −324 | −290 | $r = \dfrac{-290 + 324}{-285 + 324}$ | 13 | 13 | 87 |
| | −300 | $r = \dfrac{-300 + 324}{-285 + 324}$ | 38 | 38 | 62 |
| | −310 | $r = \dfrac{-310 + 324}{-285 + 324}$ | 64 | 64 | 36 |
| | −500 | V < LL | 100 | 100 | 0 |

TABLE 4

Example with MDD = G

| | v | working | p | s | r |
|---|---|---|---|---|---|
| T = 200 | 0 | V < LL | 0 | 0 | 100 |
| UL% = 5, LL% = 8 | 85 | V < LL | 0 | 0 | 100 |
| UL = T(1 + UL%) = 210 | 190 | $s = \dfrac{190 - 184}{210 - 184}$ | 23 | 23 | 77 |
| LL = T(1 − LL%) = 184 | 200 | $s = \dfrac{200 - 184}{210 - 184}$ | 62 | 62 | 38 |
| | 207 | $s = \dfrac{207 - 184}{210 - 184}$ | 88 | 88 | 12 |
| | 390 | V > UL | 100 | 100 | 0 |
| T = −300 | 0 | V > UL | 100 | 100 | 0 |
| UL% = 5, LL% = 8 | −130 | V > UL | 100 | 100 | 0 |
| UL = T (1 − UL%) = −285 | −290 | $s = \dfrac{-290 + 324}{-285 + 324}$ | 87 | 87 | 13 |
| LL = T(1 + LL%) = −324 | −300 | $s = \dfrac{-300 + 324}{-285 + 324}$ | 62 | 62 | 38 |
| | −310 | $s = \dfrac{-310 + 324}{-285 + 324}$ | 36 | 36 | 64 |
| | −500 | V < LL | 0 | 0 | 100 |

TABLE 5

Example with MDD = T

| | v | working | p | s | r |
|---|---|---|---|---|---|
| T = 200 | 0 | V < LL | 0 | 0 | 100 |
| UL% = 5, LL% = 8 | 85 | V < LL | 0 | 0 | 100 |
| UL = T(1 + UL%) = 210 | 190 | $s = \dfrac{190 - 185}{200 - 185}$ | 33 | 33 | 67 |
| LL = T(1 − LL%) = 184 | 200 | $s = \dfrac{200 - 185}{200 - 185}$ | 100 | 100 | 0 |
| | 207 | $s = \dfrac{207 - 210}{200 - 210}$ | 30 | 30 | 70 |
| | 390 | V > UL | 0 | 0 | 100 |
| T = −300 | 0 | V > UL | 0 | 0 | 100 |
| UL% = 5, LL% = 8 | −130 | V > UL | 0 | 0 | 100 |
| UL = T (1 − UL%) = −285 | −290 | $s = \dfrac{-290 + 285}{-300 + 285}$ | 33 | 33 | 67 |
| LL = T(1 + LL%) = −324 | −300 | $s = \dfrac{-300 + 285}{-300 + 285}$ | 100 | 100 | 0 |
| | −310 | $s = \dfrac{-310 + 324}{-300 + 324}$ | 58 | 58 | 42 |
| | −500 | V < LL | 0 | 0 | 100 |

The values p, s and r defined and used in the tables above relate to a measure k in time interval x, being observed at time t. The more general specification of the method is defined as follows:

v represents v(k, t, x), an actual/forecast value for measure k in time interval x observed from time interval t;

p represents mp(k, t, x), the performance of measure k in time interval x observed from time interval t;

s represents ms(k, t, x), the success contribution if measure k in time interval x observed from time interval t; and r represents mr(k, t, x), the risk associated with measure k in time interval x observed from time interval t.

It follows that:

$$mp(k, t) = \sum_x mp(k, t, x) * twp(t, x)$$

where mp(k, t) is the performance of measure k as assessed at time t and twp (t, x) is the relative weight assigned to performance values in each time interval x in the assessment being made in time interval t. Similarly, $$ms(k, t) = \sum_x ms(k, t, x) * tws(t, x)$$

$$mr(k, t) = \sum_x mr(k, t, x) * twr(t, x)$$

where ms(k,t) is the success of measure k as assessed at time t, mr(k,t) is the risk of measure k as assessed at time t, tws(t,x) is the relative weight assigned to success values in each time interval x and twr(t,x) is the relative weight assigned to risk values in each time interval x.

Given that the performance of measure type n at time t is mtp(n, t), then:

$$mtp(n, t) = \sum_k mp(k, t) * ml(n, k)$$

where ml(n, k) is the relative strength of the link connecting measure k to measure type n.

Similarly, $$mts(n, t) = \sum_k ms(k, t) * ml(n, k)$$

$$mtr(n, t) = \sum_k mr(k, t) * ml(n, k)$$

where mts(n,t) is the success of measure type n at time t and mtr(n,t) is the risk of measure type n at time t.

Given that object j performance at time t is p(j, t), then:

$$p(j, t) = \sum_n mtp(n, t) * mtl(j, n)$$

where mtl (j, n) is the relative strength of the link connecting measure type n to object j.

Similarly, $$s(j, t) = \sum_n mts(n, t) * mtl(j, n)$$

$$r(j, t) = \sum_n mtr(n, t) * mtl(j, n)$$

where s(j,t) is the success factor of object j at time t and r(j,t) is the risk factor of object j at time t.

The method is now extended to accommodate state change measures. State changes are defined as the transition from one phase to another.

Any concept can be a state change concept, meaning that the concept and all of the objects in the concept are associated with a set of phases that is specific to that concept. For example, state changes can be associated with projects (planning, execution, etc), products (life cycle), relationships (stages of maturity).

For each state change concept there is a state change measure k whose purpose is to track the progress of state changes. The following method describes how the actual/forecast and target values can be derived for all points in time, for any state change object.

Each phase in an associated set of phases has a sequence number such that, when phases associated with a concept are arranged in accordance with their sequence number, they define a standard life cycle for the objects in that concept.

Each phase associated with a state change concept J has a phase description, phase purpose, a sequence number and a progress value. The sum of the progress values of all phases associated with any state change concept equals 100.

Each object in a state change concept J is associated with components, which may have a one-to-one or a many-to-one relationship with the phases. Each object in a state change concept may be associated with milestones which, if they exist, may have a one-to-one or a many-to-one relationship with the components. A milestone associated with a component is said to be "in the component", and "in the phase" with which the component is associated.

The components associated with a phase are said to be "in the phase", and they are arranged sequentially according to a sequence number within the phase.

The progress value of a phase is used to determine a progress value for each milestone in that phase. For an object j observed at time t, if phase f has a progress value pv(f) then each milestone g in phase f has a progress value $$mv(g) = \frac{pv(f) - pc(f)}{n(f)}$$

where pc(f) is the progress value associated with completing phase f, over and above the completion of the milestones, and n(f) is the number of milestones in phase f.

For each component h in phase f, for an object j observed at time t, the progress value of component h, cv(h), in time interval x, is $$cv(h) = \sum_g mv(g)$$

for all milestones g in component h.

Phases, components and milestones for an object j have one current state at any time: e.g. future (not commenced and not due to commence yet), current (active), overdue (not complete, but completion is past due)—all "incomplete" states, or complete.

The state of a milestone can be changed by an authorized person indicating whether or not the milestone, in relation to a specific object at a particular point in time, is complete.

The state of a component is incomplete while any of the milestones in that component are incomplete, and it is automatically complete when all of the milestones in the component are complete.

The state of a phase is incomplete while any of the components or milestones in that phase are incomplete. A phase is only complete when all of the milestones and components in the phase are complete, and the specific activities associated with phase completion are also complete.

For an object j observed at time t, the progress of a milestone g at time x is:

$$mp(g) = mv(g) * sm(g)$$

where sm(g) is the status of milestone g (e.g. 0 if incomplete, 1 if complete);

For an object j observed at time t, the progress of a component h at time x is:

$$cp(h) = \sum_g mp(g)$$

for all milestones g in component h;

For an object j observed at time t, the progress of a phase f at time x is:

$$pp(f) = pc(f) * sp(f) + \sum_h cp(h)$$

for all components h in phase f, where sp(f) is the status of the completion activities associated with phase f (e.g. 0 if incomplete, 1 if complete);

The value of progress measure k at time x, observed at time t, is v(k,t,x), where $$v(k, t, x) = \sum_f pp(f)$$

for all phases f associated with the Concept J.

This method enables the state change measure associated with every object in a state change concept to have a derived progress value (in the range 0 to 100).

In order to measure actual/forecast progress against a plan or targets, there is required a method for generating plan or target values using standards to minimize manual effort:

The start and end dates of an object's life cycle are defined manually;
  an estimated end date for each phase f in object j is calculated as follows:

$$\text{end date } (f) = LC\text{start}(j) + (LC \text{ duration} * T/100)$$

where LCstart(j) is the start of the lifecycle for object j, LCduration is the duration of the lifecycle for object j, and T is the sum of the phase progress values in sequence to phase f i.e.

$$T = \sum_{n=1}^{f} pv(n)$$

The start date of the first phase is LCstart(j), and the start date for all other phases is the end date of the preceding phase.

An estimated end date for each component h in phase f, cedate(h), is calculated as follows:

$$ce\text{date}(h) = cs\text{date}(f, h) + pd(f) * \frac{cv(h)}{pv(f)}$$

where csdate(f,h) is equal to the start date of the phase for the first component in the phase, and equal to cedate(h−1) for all components after the first and pd(f) is the duration of phase f for object j.

The difference between the enddate of the last component in the phase, and the end date of the phase, is the time provided for completion of activities associated with completion of the phase.

The start date for each milestone is the same as the start date for the component to which it belongs, and the end date for each milestone is the same as the end date for the component to which it belongs. The end date of a milestone can be varied, provided it remains within the date range of the component. Similarly, the component start and end dates can be varied (including allowing components to overlap) provided they remain within the date range of the phase to which they belong. When component dates are changed, the milestone dates need to be adjusted to fit within the new date range. The start and end dates of phases can be varied, provided the date ranges of the phases do not overlap, and they remain within the date range of the object lifecycle. When phase dates are changed, the component dates need to be adjusted to fit within the new date range. The start and end dates of an object life cycle can be varied, provided the date ranges of the phases are adjusted to fit within the new date range.

For a state change measure k whose purpose is to track the progress of state changes, the dates estimated using the method above define the expected state and progress values, which are the plan or target values for each time interval.

The method is now extended to accommodate perception measures. For some concepts, perceptions are an important measure of outcomes.

Any concept can be a perception concept, meaning that the concept and all of the objects in the concept are associated with people whose perceptions need to be measured and used in the determination of object performance, through association with one or more perception measures.

A perception concept is associated with relationship types (e.g. sponsors, beneficiaries, suppliers); event types (e.g. the completion of a state change phase, the end of a calendar month, the appointment of a new employee); assessment objectives (e.g. determine the level of commitment or satisfaction with the process or service); one or more questions associated with each assessment objective; and, associated with each question, two or more response options with each of which is associated as response value.

For each object j in perception concept J there is a set of people each of whom is associated with the object and one or more of the relationship types.

Each object has conditions which generate specific instances of event types e.g. an event occurs when a state change object completes a specific phase, a measure performance value crosses a trigger threshold, or a certain date is reached. An event is associated with a specific date and time.

Each object in a perception concept has a desired sample size and sampling frequency associated with each relationship type e.g. two beneficiaries will be sampled each month, either at the completion of a phase or, if no phase completion occurs during the month, at the end of the month.

Each event type is associated with a selection of relationship types and, for each relationship type, a specific set of assessment objectives which are, in turn, associated with a specific set of questions.

For each object, the occurrence of a specific event results in the identification of a specific set of people (denoted respondents) being selected from each associated relationship type, and the administration of a specific set of questions to each respondent.

For each object j in perception concept J, at a time t, each perception measure has a link of a certain strength with one or more assessment objectives, and each assessment objective has a link of a certain strength with one or more questions. Object j at time t has a link of a certain strength with each respondent. Perception measure k is assumed to be associated with relationship type R. In general, a measure can be derived from other measures, so the association of a measure with only one relationship type does not limit the generality of the solution method described herein.

For each question "a", minimum and maximum response values at time t are qmin(a) and qmax(a).

For each assessment objective "b" associated with object j, measure k and relationship type R, the minimum and maximum response values at time t are:

$$aomin(b) = \sum_a qmin(a) * qw(b, a)$$

$$aomax(b) = \sum_a qmax(a) * qw(b, a)$$

where qw(b,a) is the relative strength of the link from b to a (the sum of the link strengths equals 1).

For each perception measure k associated with object j and relationship type R, the minimum and maximum response values at time t are:

$$mmin(k) = \sum_b aomin(b) * aow(k, b)$$

$$mmax(k) = \sum_b aomax(b) * aow(k, b)$$

for all assessment objectives b linked to measure k where aow(k, b) is the relative strength of the link from k to b (the sum of the link strengths equals 1).

For each respondent i associated with object j and relationship type R, the response to question "a" at time t scores a response value of qv(a, i) where:

$$qmin(a) \leq qv(a,i) \leq qmax(a)$$

For each relationship type R associated with object j, the response value to question "a" at time t is:

$$qv(a, R) = \sum_i qv(a, i) * pw(j, i)$$

for all respondents i in relationship type R, where pw(j,i) is the strength of the link from object j to person i.

For each assessment objective b associated with object j and measure k, the response value at time t is:

$$aov(b, R) = \sum_a qv(a, R) * qw(b, a)$$

for all questions "a" in assessment objective b, responded to by people in relationship type R.

The normalized score for assessment objective b and relationship type R, with minimum 0 and maximum 100, is V(b, R) where:

$$V(b, R) = \frac{aov(b, R) - aomin(b)}{aomax(b, R) - aomin(b)} * 100$$

For perception measure k associated with object j and relationship type R, the response value at time t is:

$$v(k) = \sum_b V(b, R) * aow(k, b)$$

for all assessment objectives b linked to measure k.

At any time t, v(k) has a minimum value of 0 and a maximum value of 100. v(k) is the same as v(k,t,x), an actual/forecast value for measure k in time interval x observed from time interval t For measure k, an independently defined target value T(k,t,x) is used to determine the performance, success contribution and risk associated with the measure, using v(k) to determine the actual/forecast values of performance.

Action Priority

An accountable object (eg. a person) can have direct and indirect accountability for objects all over the concept network.

The basic processing of accountability occurs in accordance with the following procedure:

1. Is it time to recalculate accountabilities?
2. Remove all indirect accountabilities
3. Build up a list of concept links, in the correct order for calculating accountability
4. In each concept, obtain all objects for the concept below (target concept) and in the current concept (source concept).
5. Find all the parent objects in the source concept and, for each parent, validate the child links.
6. For each child object which does not have a directly accountable object, set the accountable object to be the accountable object of the parent object with the strongest link value provided that the child object does not already have an indirectly accountable object which has a stronger link to a parent object in another concept.
7. Store the accountable object as being indirectly accountable for the object.

In determining which objects need the attention of a particular person, the SIPRA agent must calculate the action priority rating of every object in relation to the specific person. The action priority rating takes into account:

The importance of the object (i);

The degree of accountability that the person has for the object(a);

The extent to which the person has adequately addresses all issues and actions associated with the object (e);

The time that has elapsed since the person has made an assessment of how adequately they have addresses all issues and actions associated with the object (t);

The review cycle duration (T);

The success of the object (s);

The risk of the object (r); and

The importance weight (iw), success weight (sw) and risk weight (rw) associated with the accountable person.

The degree to which a specific Object (x) currently requires reduced attention by Accountable Person (y) based on the knowledge that the accountable person has recently addressed issues and actions associated with this object to a significant degree, is:
Reduced attention, $$RA(x, y) = 1 - e(x, y) + \frac{(T - t)}{T}$$

An example of the action priority rating (APR) for specific Object (x) in relation to Accountable Person (y) is:

$$APR(x,y) = a(x,y)*RA(x,y)*[i(x)*iw(y) + s(x)*sw(y) + r(x)*rw(y)]$$

The action priorities for the accountable person (user) are found by the SIPRA agent sorting all objects according to the action priority rating, and selecting those with the highest value. The formula for APR can be varied to suit the application.

The action priorities are extremely dynamic, and can change whenever:

the accountable person registers a degree of adequacy of action in relation to any object any importance or performance values change anywhere in the enterprise knowledge base any accountabilities change anywhere in the enterprise knowledge base any objects are added or deleted any object linkages are created or changed The SIPRA engine needs to be highly responsive, ensuring that the whole enterprise concept network is keeping up to date with all latest developments, and that all SIPRA agents are using this current knowledge to keep their human (or other intelligent being) fully up to date with the whole enterprise context.

Context

From the perspective of any person, the importance, performance, success, risk and action priorities at a concept level are determined as follows:

concept importance, the degree to which each concept is relevant or of interest to each person, is the total importance of all objects in that concept which are judged to be relevant to that person;

concept performance is the weighted average performance of all objects which are judged to be relevant to that person, weighted by object importance; and concept success, risk and action priority are defined to be the maximum object success value, the maximum object risk value and the maximum object action priority value, respectively, of all objects within the concept which are judged to be relevant to that person.

Summary of SIPRA Calculations:

| | Concept | Object |
|---|---|---|
| Importance | Sum of relevant object importances. | input by origin nodes, calculated for objects in all other concepts. |
| Performance | sum of all relevant object performances weighted by object importance. | calculated based on measure weight, target, base, actual/forecast values and measure type, for all measures associated with each object. |
| Risk | risk of the highest risk relevant object. | calculated for all objects, based on object importance, object under performance and risk tolerance factors. |
| Success | success of the highest success relevant object. | calculated for all objects, based on object importance, object performance above a minimum level and success response factors. |
| Action Priority | action priority of the highest action priority relevant object. | calculated for all objects, based on: risk and success values; risk and success factors; time factor relating to when the object was last reviewed by this person; and adequacy of review. |

Figure 4A:
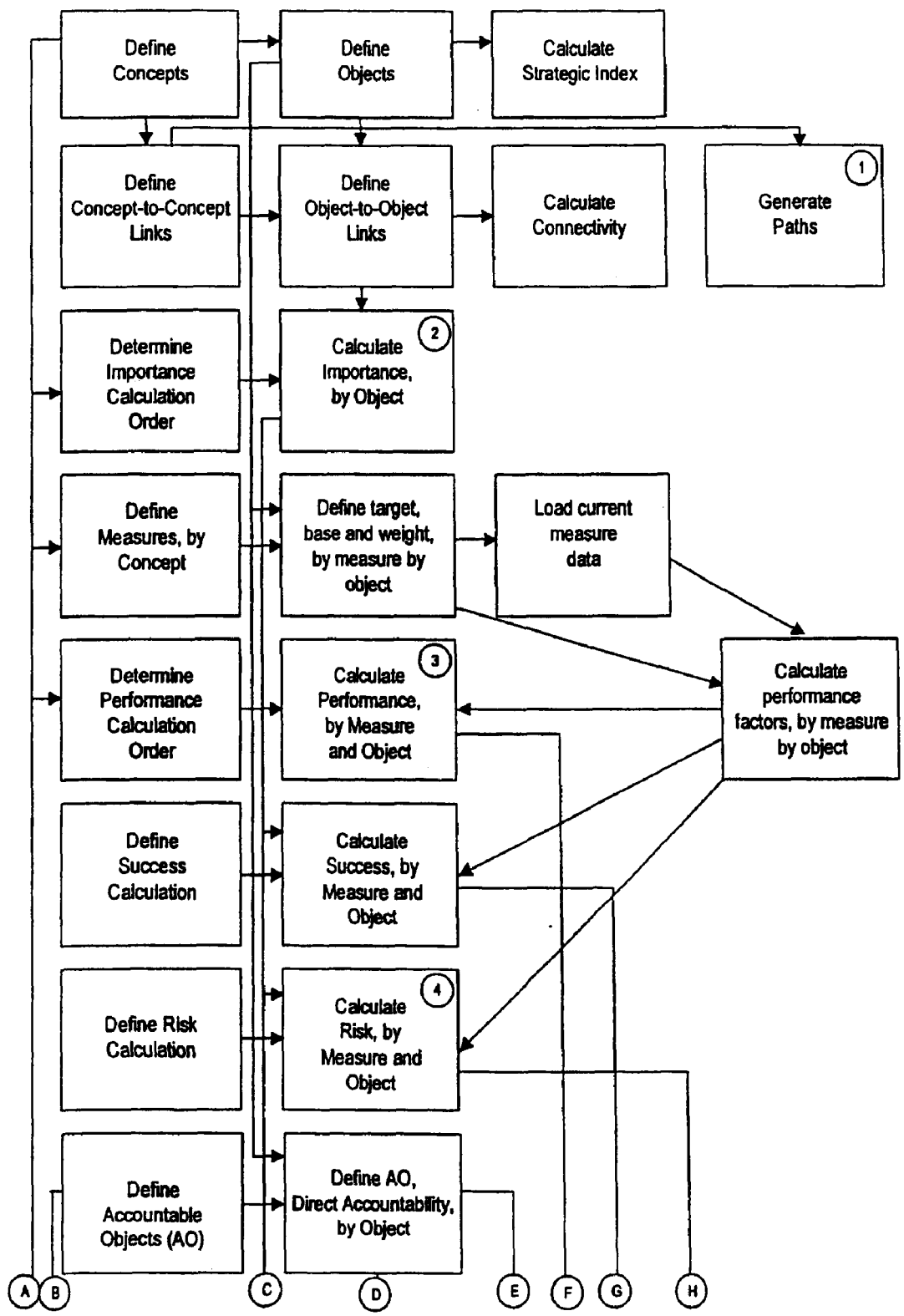
FIGS. 4a and 4b are detailed logic flow diagrams showing the steps involved in a preferred embodiment of the invention.
Figure 4B:
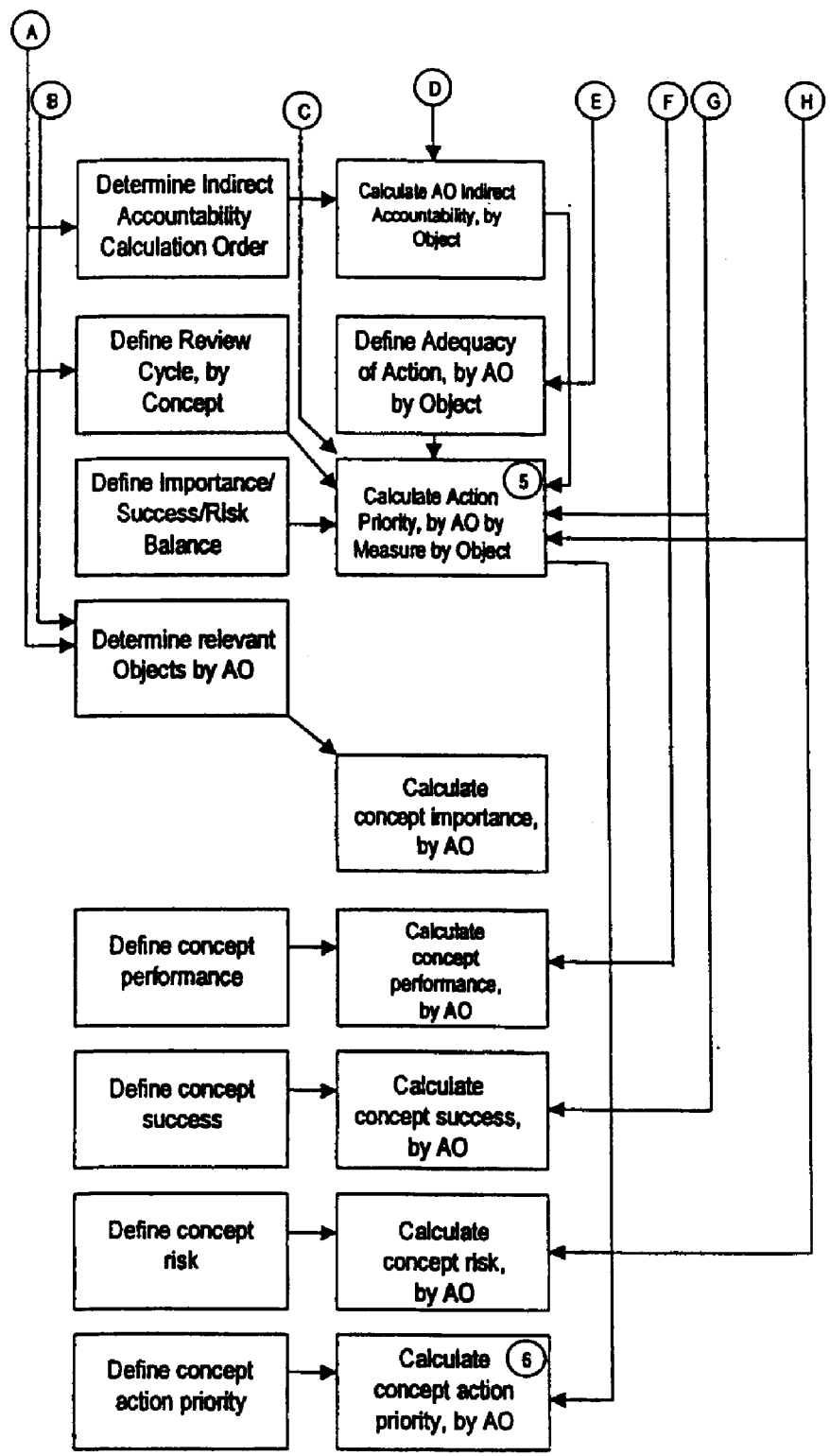

The process for calculating SIPRA values throughout a concept network is summarized in FIGS. 4a and 4b.

It is to be understood that various alterations, additions and/or modifications may be made to the parts previously described without departing from the ambit of the invention.

What is claimed is:

1. A method for organizing information into a concept network, creating an explicit model of the thinking processes of a person or community of people that facilitates the creation and sharing knowledge, including the steps of:

categorizing ideas and thoughts into concepts;

creating links between concepts;

assigning link attributes to each link between concepts, each attribute having a direction;

categorizing information into objects;

categorizing objects into concepts;

assigning object attributes to each object;

creating links between objects; and assigning link attributes to each link between objects, the direction value of the attribute being inherited from the link between corresponding concepts; and providing personal agents associated with people, with each personal agent functioning to serve the knowledge acquisition, knowledge sharing and decision making needs of its associated person wherein the concept network includes accountable objects, which are directly or indirectly accountable for other objects, and wherein an action priority rating for an accountable object is calculated by evaluating some or all of the following:

the importance of each object for which the accountable object is accountable;

the degree of accountability between the accountable object and each object;

the extent to which the accountable object has addressed all issues and actions associate with each object;

the time which has elapsed since the accountable object last considered each object;

a review cycle duration; and risk and success values associated with each object.

2. A method according to claim 1 wherein each link has a qualitative value indicating the strength of the relationship between an object and a linked object, an object and a linked concept, or a concept and a linked concept which is used in:

the calculation of link attribute values;

the calculation of object attribute values;

selecting and ranking objects based on any mathematical function using the link or object attribute values; and locating information relevant to any object by evaluating direct object links between that object and directly linked objects, and indirect object links and concept links affecting that object.

3. A method according to claim 2 wherein the degree of "relevance" of any other object to a given object is assessed by calculating the strength of the relationship between the given object and the other object, by summing the strength of any direct link between the objects and the strengths of any indirect.

4. A method according to claim 1 wherein one or more the objects or concepts represent goals for an organization to which the concept network relates, the organization may have an overall purpose, and each object and concept within the concept network is evaluated as having an importance value relative to each goal, and each goal has an importance value relative to the organisational purpose.

5. A method according to claim 4 wherein the importance values are used to allocate resources to the various goals with a view to optimizing the success of the overall organizational phase.

6. A method according to claim 1 wherein the concept network takes into account the following changes in the network over time:
   the purpose of the organization;
   the degree of existence of any object;
   the properties of links between concepts; and
   the strength of links between objects.

7. A method according to claim 1 wherein an object has associated with it one or more performance measures.

8. A method according to claim 1 wherein success and risk values are associated with objects.

9. A method according to claim 1 wherein the personal agent determines information which is relevant to bring to the attention of its associated person based on one or more of importance, performance, risk, success and action priority values associated with each object in the concept network, and the personal agent pro-actively seeks input from its associated person concerning the statue and completion of tasks.

* * * * *